(12) United States Patent
Terazono et al.

(10) Patent No.: US 7,908,250 B2
(45) Date of Patent: Mar. 15, 2011

(54) DIFFERENTIAL DATA FORMING METHOD, PROGRAM, RECORDING MEDIUM, AND APPARATUS

(75) Inventors: Kohei Terazono, Kawasaki (JP); Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 337 days.

(21) Appl. No.: 10/265,317

(22) Filed: Oct. 7, 2002

(65) Prior Publication Data

US 2003/0163496 A1    Aug. 28, 2003

(30) Foreign Application Priority Data

Feb. 28, 2002  (JP) .................................. 2002-052699

(51) Int. Cl.
*G06F 17/00*  (2006.01)
(52) U.S. Cl. ........................................ 707/661; 707/674
(58) Field of Classification Search .................. 707/204, 707/6, 101, 201, 203, 661, 674; 717/122, 717/168; 715/511; 714/8
See application file for complete search history.

(56) References Cited

U.S. PATENT DOCUMENTS

| | | | | |
|---|---|---|---|---|
| 5,479,654 A | * | 12/1995 | Squibb | 707/201 |
| 5,752,039 A | * | 5/1998 | Tanimura | 717/168 |
| 5,765,167 A | * | 6/1998 | Kiuchi et al. | 707/200 |
| RE35,861 E | * | 7/1998 | Queen | 395/772 |
| 5,822,511 A | * | 10/1998 | Kashyap et al. | 714/8 |
| 5,832,520 A | * | 11/1998 | Miller | 707/203 |
| 5,873,097 A | * | 2/1999 | Harris et al. | 707/203 |
| 5,978,805 A | * | 11/1999 | Carson | 707/10 |
| 6,101,507 A | * | 8/2000 | Cane et al. | 707/204 |
| 6,236,993 B1 | * | 5/2001 | Fanberg | 707/6 |
| 6,243,766 B1 | * | 6/2001 | Sliger et al. | 710/2 |
| 6,425,125 B1 | * | 7/2002 | Fries et al. | 717/168 |
| 6,526,574 B1 | * | 2/2003 | Jones | 717/168 |

* cited by examiner

*Primary Examiner* — Wilson Lee
*Assistant Examiner* — Michael Le
(74) *Attorney, Agent, or Firm* — Staas & Halsey LLP

(57) ABSTRACT

One new file and one old file are sequentially compared from the heads of the files on a predetermined data unit basis. If a data match is found, transfer information showing a position and a data length of the old file is output. If a data mismatch is found by the sequential comparison, the old file is searched in both directions from the data position where the mismatch had been found in the old file, thereby finding a portion which matches with the data of the new file. If the matching portion can be found, shift information up to the matching portion on the old file is output. If the matching portion cannot be found, new data is added to transfer replacement information showing a length of data of the mismatching portion of the old file at a position until the matching portion can be found, and the resultant transfer replacement information is output.

15 Claims, 25 Drawing Sheets

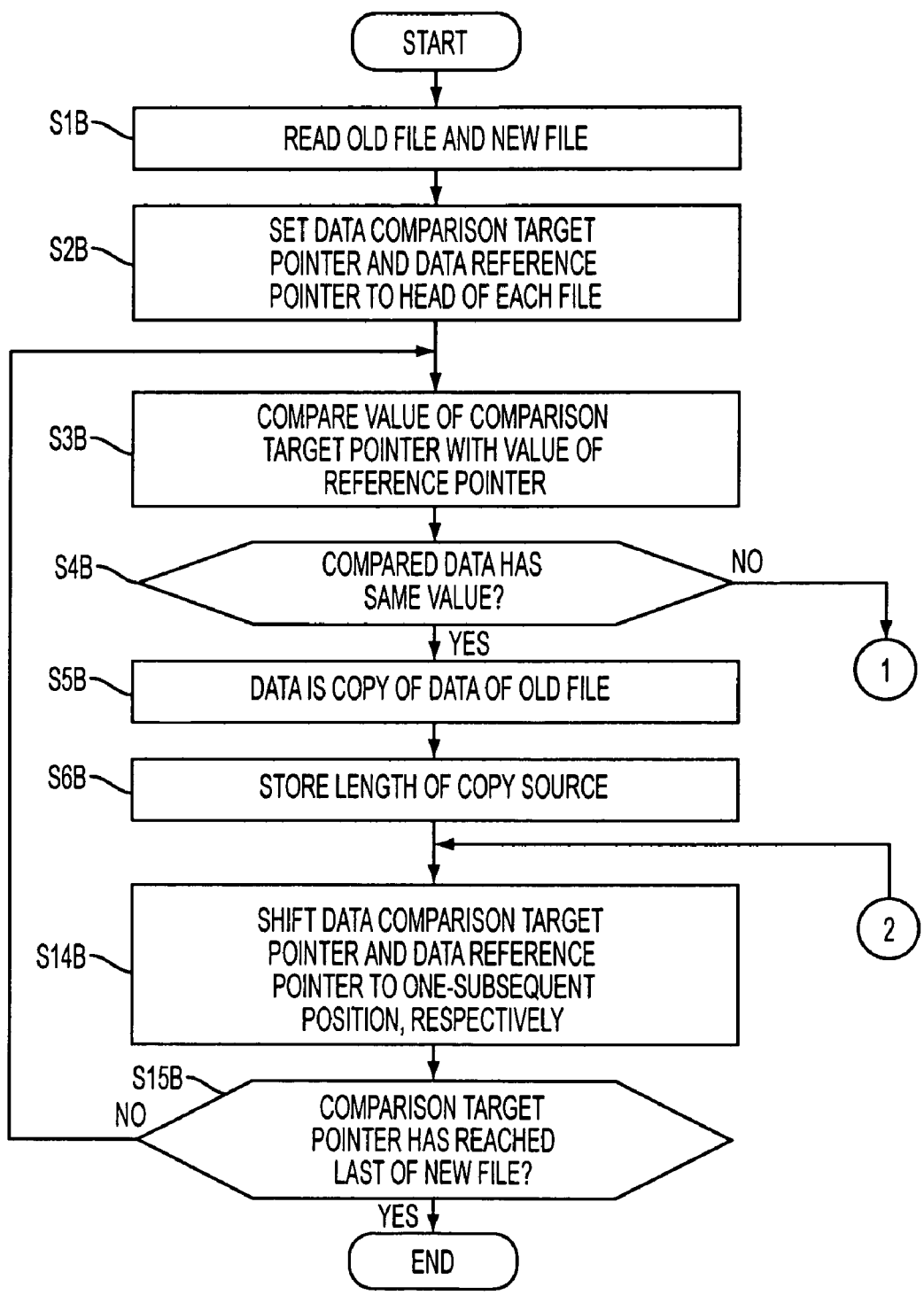

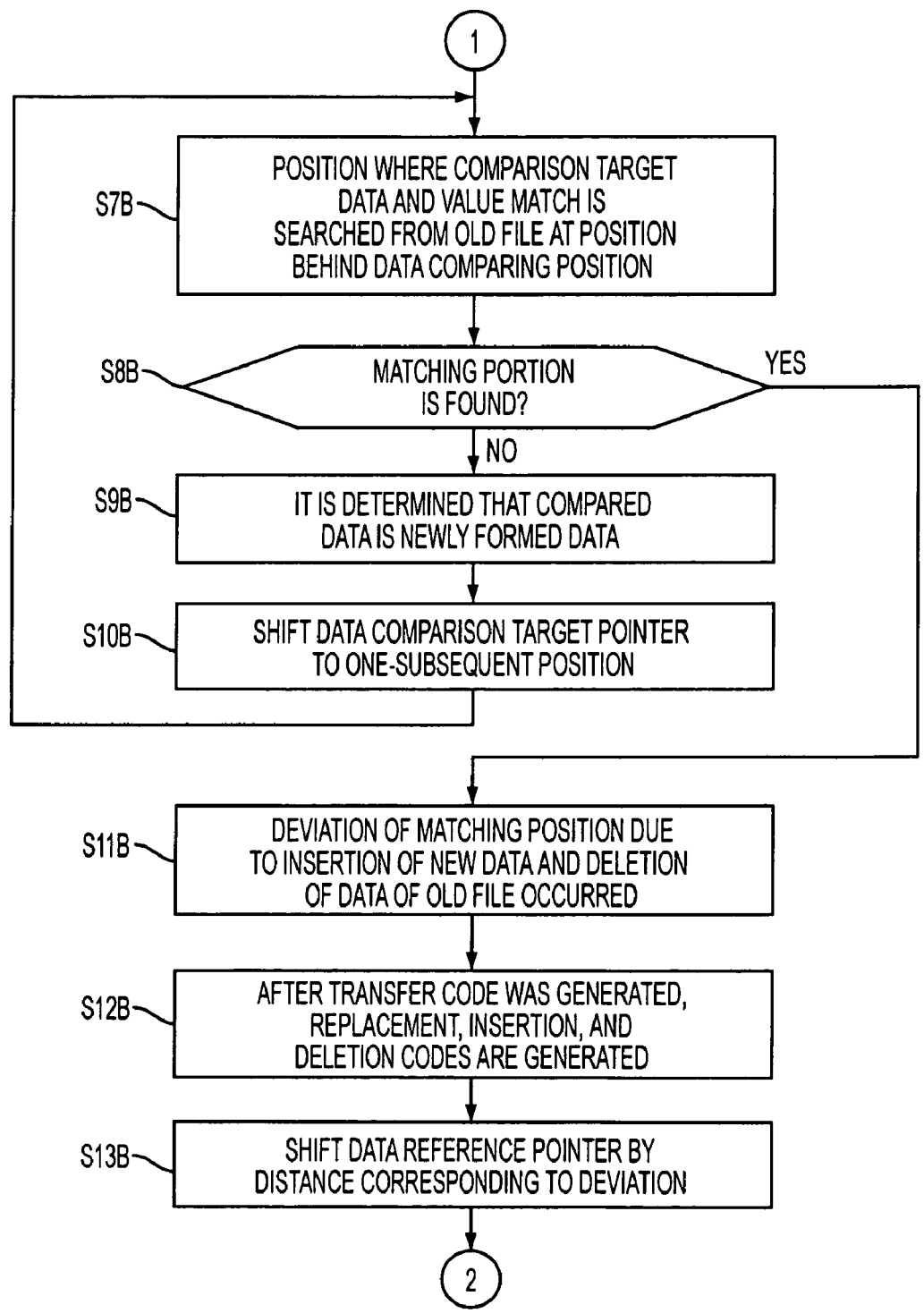

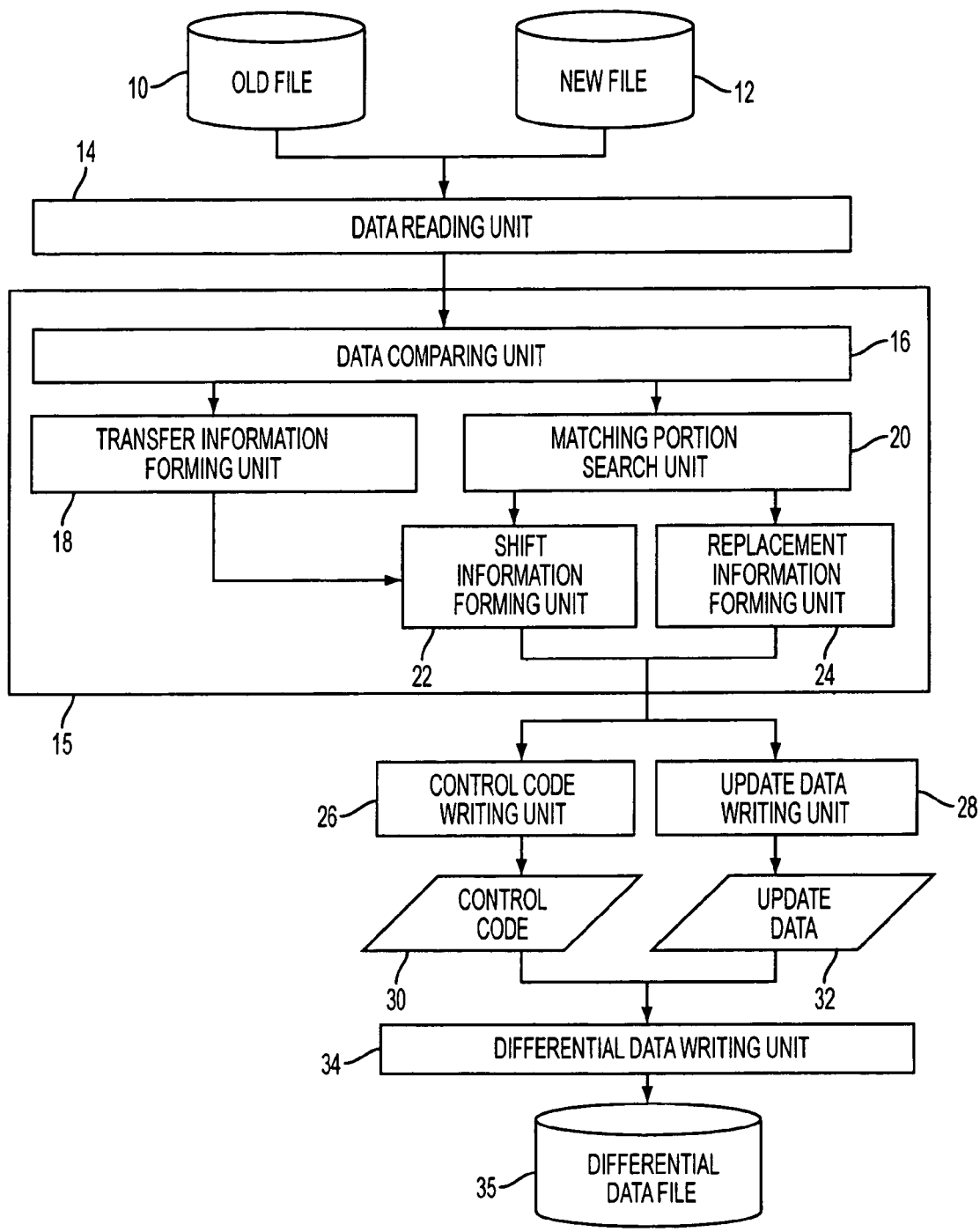

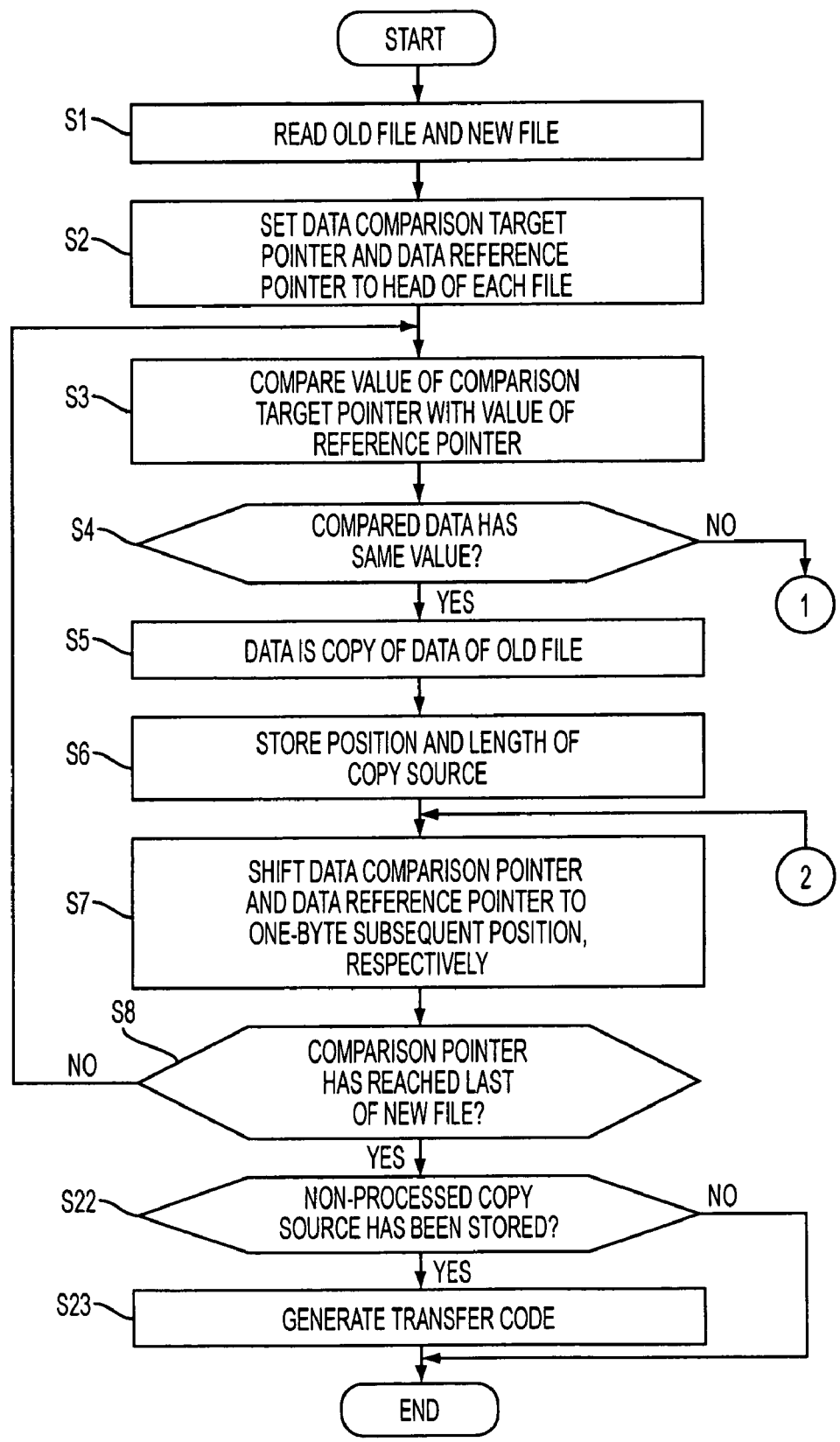

DIFFERENTIAL DATA FORMING METHOD, PROGRAM, RECORDING MEDIUM, AND APPARATUS

BACKGROUND OF THE INVENTION

1. Field of the Invention

The present invention relates to a data synchronization method, a program, a recording medium, and an apparatus for forming differential data by comparing two new and old files. More particularly, the present invention relates to a data synchronization method, a program, a recording medium, and an apparatus for forming differential data that is used in order to update an old file to a new file.

2. Description of the Related Arts

If updating is necessary for upgrading, backup, or the like of software on a computer or firmware on an apparatus, it is demanded to perform uploading and downloading at low costs even in a low-speed communication environment by using differential data formed by comparing a new file and an old files.

Hitherto, in the case of updating a file of a program, data, or the like to a new file, there are two methods: a method of replacing an entire old file with an entire new file, and a method of providing differential data between an old file and a new file and only updating information in the files that need updating. The updating method by differential data has an advantage such that the updating can be performed by using less information than that in the case of the method of replacing all files and is advantageous in terms of costs as the information amount is smaller in the case of transferring the updating information to locations where the old files exist. As a conventional method of forming the differential data, as shown in flowcharts of FIGS. 1A and 1B, there is a method (JP-A-4-163626) whereby two new and old files are compared from the heads, mismatching portions are classified as updated portions into three categories "replacement", "insertion", and "deletion", and values obtained after the updating according to (1) the category of the updating, or (2) the category of the "replacement" or "insertion"

are described as differential data. The term portion means data within the file no smaller than one byte and no larger than the number of total bytes in the file. Processing steps in FIGS. 1A and 1B are as follows.

S1B: The old file and new file are read out from a disk or the like.

S2B: A data comparison target pointer is set to the head of the new file, and a data reference pointer is set to the head of the old file.

S3B: A value indicated by the comparison target pointer is compared with a value shown by the data reference pointer.

S4B: If a comparison result in step S3B indicates matching, step S5B follows. If they differ, step S7B follows.

S5B: It is determined that the value shown by the comparison target pointer is a copy of the old file.

S6B: A length of copy source is stored and step S14B follows.

S7B: The data that matches with the value shown by the data comparison target pointer is searched from the data existing behind the data reference pointer.

S8B: As a result of the search, if the matching data is found, step S11B follows. If the matching data is not found, step S9B follows.

S9B: It is determined that the comparison target data is the newly formed data.

S10B: The data comparison target pointer is shifted to one-subsequent position and step S7B follows.

S11B: It is determined that the matching position was deviated due to the insertion of the new data or the deletion of the data of the old file.

S12B: After a transfer code is generated, one of a replacement code, an insertion code, and a deletion code is generated in accordance with a shape of deviation.

S13B: The data reference pointer is shifted by a distance corresponding to the deviation.

S14B: Each of the data comparison target pointers and the data reference pointers are shifted to one-subsequent position.

S15B: If the data comparison target pointer does not reach the end of the new file, the processing routine is returned to step S3. If it reached the end, the processing routine is finished.

FIGS. 2A and 2B show a replacing process in the conventional data forming method. An old file 200 in FIG. 2A is constructed by data A, B, and C. A new file 202 is constructed by data A, B', and C. The data A and C denote matching portions 204 and 208. The data B and B' is a replacement portion 206. FIG. 2B shows a differential data file 210 formed by the flowcharts of FIGS. 1A and 1B. First, with respect to the matching portion 204 of the data A, a transfer code 212 having a transfer code number and a copy source data length (a bytes) is generated. With respect to the replacement data 206 of the next data B and B', a replacement code 214 having a replacement code number and a replacement data length (b bytes) is generated and differential data 216 of (B−B') is added. Further, with respect to the matching portion 208 of the data C, a transfer code 218 having a transfer code number and a copy source data length (c bytes) is generated.

FIGS. 3A and 3B show an inserting process in the conventional data forming method. The old file 200 in FIG. 3A is constructed by data A and B and the new file 202 is constructed by the data A and B and new data C inserted therebetween. The data A and B corresponds to the matching portions 204 and 208 and the data C corresponds to the inserting portion 206. FIG. 3B shows the differential data file 210 formed by the flowcharts of FIGS. 1A and 1B. With respect to the matching portions 204 and 208 of the data A and B, in a manner similar to FIG. 3B, the transfer codes 212 and 218 each having a transfer code number and a copy source data length are generated. With respect to an inserting portion 220 of the data C, an insertion code 222 having a transfer code number and an insertion data length (c bytes) is generated and insertion data 224 is added.

FIGS. 4A and 4B show a deleting process in the conventional data forming method. The old file 200 in FIG. 4A is constructed by data A, B, and C and the new file 202 is constructed by the data A and B and the data C is deleted. The data A and C corresponds to the matching portions 204 and 208 and the data B corresponds to a deleting portion 226. FIG. 4B shows the differential data file 210 formed by the flowcharts of FIGS. 1A and 1B. With respect to the matching portions 204 and 208 of the data A and C, in a manner similar to FIG. 3B, the transfer codes 212 and 218 each having a transfer code number and a copy source data length are generated. With respect to the deleting portion 226 of the data B, a deletion code 228 having a deletion code number and a deletion data length (b bytes) is generated.

However, such a conventional data synchronization method as mentioned above, since the updating information is expressed by three categories "replacement", "insertion", and "deletion" on the assumption that the correct matching portions can be always found out when the matching portions of the new and old files are searched, there are the following problems.

FIG. 5 shows an example of an inserting process. The old file 200 is constructed by data A and B. The new file 202 is constructed by the data A and B and also the data C inserted there between. With respect to the data A of the old file 200, the new file 202 has two matching portions 204 and 230. However, according to the conventional data synchronization method, since the second matching portion 230 does not belong to any of the categories of "replacement", "insertion", and "deletion", there is a problem with the insertion of the new data A. Because of this problem, a determination is made that all subsequent new and old files are mismatching portions, and they are generated only in the category "replacement". Consequently, an amount of differential data increases.

FIG. 6 shows a case where a correspondence relation between the new and old files is wrong. It is now assumed that the old file 200 is constructed by data A, B, C, and B and the new file 202 is constructed by the data A, B, and C and the last data B, of the old file 200, is deleted. However, in the data synchronization process when the comparison between the data B 234 of the old file 200 and the data B of the new file 202 is made, if it is determined that the data B of the new file is erroneously recognized as data B' 232, that is, if the updating portion is erroneously determined, a replacement code and new data B' are erroneously generated as a category of "replacement". In this case, even if the same data B as the data that was erroneously determined exists on the old file existing behind the position where the erroneous discrimination occurred, there is no room to utilize the data B. Upon updating of the old file, the data is erroneously rewritten to the data B' which was erroneously determined. Further, in a program file, there is a case where by rewriting a specific program code, the same value repetitively appears as a differential value that is added to the replacement information. However, in the conventional data synchronization method, no consideration is made to such a point.

SUMMARY OF THE INVENTION

According to the present invention, there are provided a data synchronization method, a program, a recording medium, and an apparatus, in which it is also possible to cope with patterns other than "replacement", "insertion", and "deletion" due to a comparison between new and old files. This present invention results in an amount of differential data being reduced, and even if a comparison determination about the new and old files is erroneously made, it can be corrected by subsequent processes, thereby raising reliability.

According to the present invention, there is provided a data synchronization method comprising:

a comparing step wherein two new and old files are sequentially compared from heads of the files on a predetermined data unit basis;

a transfer information forming step wherein if a coincidence of the data is determined by the sequential comparison, transfer information (transfer code) showing a position and a data length of the old file is output;

a searching step wherein if a dissidence of the data is determined by the sequential comparison, the old file is searched in both forward and backward directions from a data position where the dissidence has been determined on the old file, thereby searching a portion which coincides with the data of the new file;

a shift information forming step wherein if the matching portion can be searched in the searching step, shift information (shift code) up to the matching portion on the old file is output; and a replacement information forming step wherein if the matching portion cannot be searched in the searching step, new data is added to transfer replacement information (transfer replacement code) showing a data length of the mismatching portion of the old file at a position until the matching portion can be searched and resultant transfer replacement information is output.

As mentioned above, according to the present invention, if the mismatching property of the data is determined by the sequential comparison between the new and old files, the old file is searched in both the forward and backward directions, and the data in the old file which was once referred to can be again referred to. Beyond the conventional categories "replacement", "insertion", and "deletion", the present invention makes it possible to cope with other patterns. Forward direction means towards the head of the file, and backward direction means away from the head of a file. In addition, the present invention reduces creation of redundant differential data, and a size of differential data is reduced. Even if the updating portion is erroneously made to correspond in a subsequent difference extracting process, by again referring to the data in the old file that was once referred to, its influence is suppressed to the minimum, the creation of redundant differential data is reduced, and a size of differential data is reduced.

In the searching step where the portion in the old file which matches with the data in the new file, and the continuous matching portions of a predetermined number (n) or more which are subsequent to the above matching portion are searched, the determination that the data matches is made. This process of match determination corresponds to a case where the matching portions are concentrated on specific portions of the new and old files. As mentioned above, according to the present invention, there is executed the match determination of two stages such that if one-byte data of the new file as a comparison target and one-byte data of the old file which was referred to match, further, only when subsequent (n) bytes or more match, the target portion is determined to be the matching portion which is not updated, thereby correctly discriminating the matching portion which is not updated and the mismatching portion which is updated. At the same time, according to the match determination of two stages, an opportunity of determining the mismatching portion serving as an updating target is increased as much as possible, redundancy of the differential data is reduced by the replacing process regarding the mismatching portion, and the size of differential data is reduced.

In the second searching step in stage two of match determination, it is also possible to construct in a manner such that if the portion in the old file which matches with the data of the new file, and the matching portions of a predetermined number (y) or more of data distributed in a predetermined number (x) of data subsequent to such a matching portion are searched, the data matches. Such a determination is a match determination in the case where the matching portions are distributed in the new and old files.

In the shift information forming step, a shifting direction in which a forward position on the old file is set to a negative direction and a backward position on the old file is set to a positive direction and a shift length showing a length of data up to the matching portion on the old file are output. In the searching step, if a structure of the file is that of a program file written by an n-bit code, the search is performed every other (n) bits in both forward and backward directions from the position of the data which was determined to be mismatching in the old file. Thereby, the searching of the portion that matches with the data in the new file is completed, and the matching portion for the old file can be searched at a high speed.

In the replacement information forming step, when differential data between the old data and the new data matches with differential data of replacement information formed in the past, the new data is not added, but replacement information (transfer increase code) showing the same as a past differential pattern or updating pattern is output. For example, in the case where a specific program code has been changed or the like, new data of the same value is formed by the replacing process based on the mismatch determination of the new and old files each time the differential pattern having a value of the same difference appears. However, according to the present invention, the new data of the same value is necessary only in the beginning and by making the new data unnecessary in the residual replacing process, the creation of redundant differential data is reduced, and a size of differential data is reduced. By increasing the success of the replacing process due to the data mismatch as much as possible by the comparing process of the new and old files, the reduction of the differential data amount by the replacing process of the present invention as mentioned above is further enhanced.

In the replacement information forming step, if the matching portion cannot be found in the searching step due to the insertion of the new data in the new file, the new data is added to the transfer replacement information showing the data length of the mismatching portion of the old file at a position until the matching portion can be searched and the resultant transfer replacement information is output. That is, the conventional inserting process is included in one form of the replacing process in the present invention.

In the shift information forming step, if the matching portion with the data of the new file cannot be found in the searching step due to deletion of the data in the old file, shift information showing a shifting direction and the shift amount up to the backward matching portion on the old file is formed. That is, the conventional deleting process is included in one form of the shifting process in the present invention.

According to the present invention, there is provided a program for forming differential data, wherein the program allows a computer to execute:

a comparing step wherein two new and old files are sequentially compared from heads of the files on a predetermined data unit basis;

a transfer information forming step wherein if a coincidence of the data is determined by the sequential comparison, transfer information showing a position and a data length of the old file is output;

a searching step wherein if a dissidence of the data is determined by the sequential comparison, the old file is searched in both forward and backward directions from a data position where the dissidence has been determined on the old file, thereby searching a portion which coincides with the data of the new file;

a shift information forming step wherein if the matching portion can be searched in the searching step, shift information up to the matching portion on the old file is output; and a replacement information forming step wherein if the matching portion cannot be searched in the searching step, new data is added to transfer replacement information showing a data length of the mismatching portion of the old file at a position until the matching portion can be searched and resultant transfer replacement information is output.

According to the present invention, there is provided a computer-readable recording medium which stores a program for forming differential data, wherein the program stored in the recording medium allows a computer to execute:

a comparing step wherein two new and old files are sequentially compared from heads of the files on a predetermined data unit basis;

a transfer information forming step wherein if a coincidence of the data is determined by the sequential comparison, transfer information showing a position and a data length of the old file is output;

a searching step wherein if a dissidence of the data is determined by the sequential comparison, the old file is searched in both forward and backward directions from a data position where the dissidence has been determined on the old file, thereby searching a portion which coincides with the data of the new file;

a shift information forming step wherein if the matching portion can be searched in the searching step, shift information up to the matching portion on the old file is output; and a replacement information forming step wherein if the matching portion cannot be searched in the searching step, new data is added to transfer replacement information showing a data length of the mismatching portion of the old file at a position until the matching portion can be searched and resultant transfer replacement information is output.

According to the present invention, there is provided a data synchronization apparatus comprising:

a data comparing unit which sequentially compares two new and old files from heads of the files on a predetermined data unit basis;

a transfer information forming unit which, if a coincidence of the data is determined by the data comparing unit, outputs transfer information showing a position and a data length of the old file;

a matching portion search unit which, if a dissidence of the data is determined by the data comparing unit, searches the old file in both forward and backward directions from a data position where the dissidence has been determined on the old file, thereby searching a portion which coincides with the data of the new file;

a shift information forming unit which, if the matching portion can be searched by the matching portion search unit, outputs shift information up to the matching portion on the old file; and a replacement information forming unit which, if the matching portion cannot be searched by the matching portion search unit, adds new data to transfer replacement information showing a data length of the mismatching portion of the old file at a position until the matching portion can be searched and outputs resultant transfer replacement information.

Details of the program, recording medium, and data synchronization apparatus in the present invention are fundamentally the same as those in the case of the data synchronization method.

The above and other objects, features, and advantages of the present invention will become more apparent from the following detailed description with reference to the drawings.

BRIEF DESCRIPTION OF THE DRAWINGS

FIGS. 1A and 1B are flowcharts for a conventional data synchronization process;

FIG. 7 is a functional block diagram in a construction of an apparatus of the present invention;

FIGS. 28A to 28C are flowcharts for the data synchronization process according to the present invention.

DETAILED DESCRIPTION OF THE PREFERRED EMBODIMENT

Figure 2A:
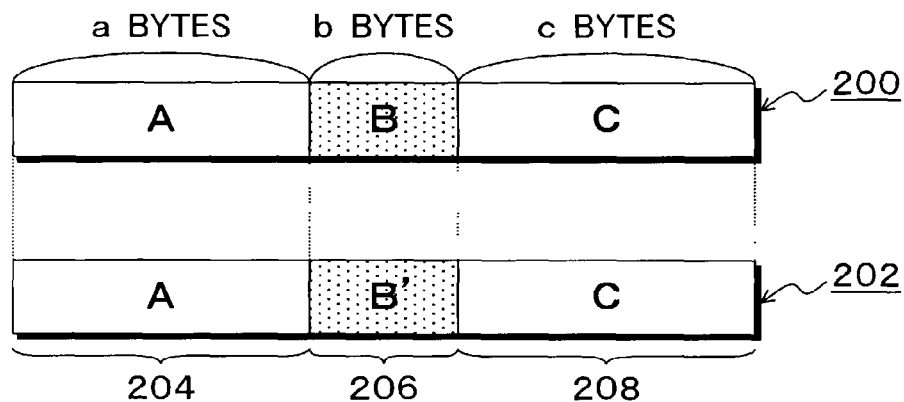
FIGS. 2A and 2B are explanatory diagrams of a conventional replacing process.
Figure 2B:
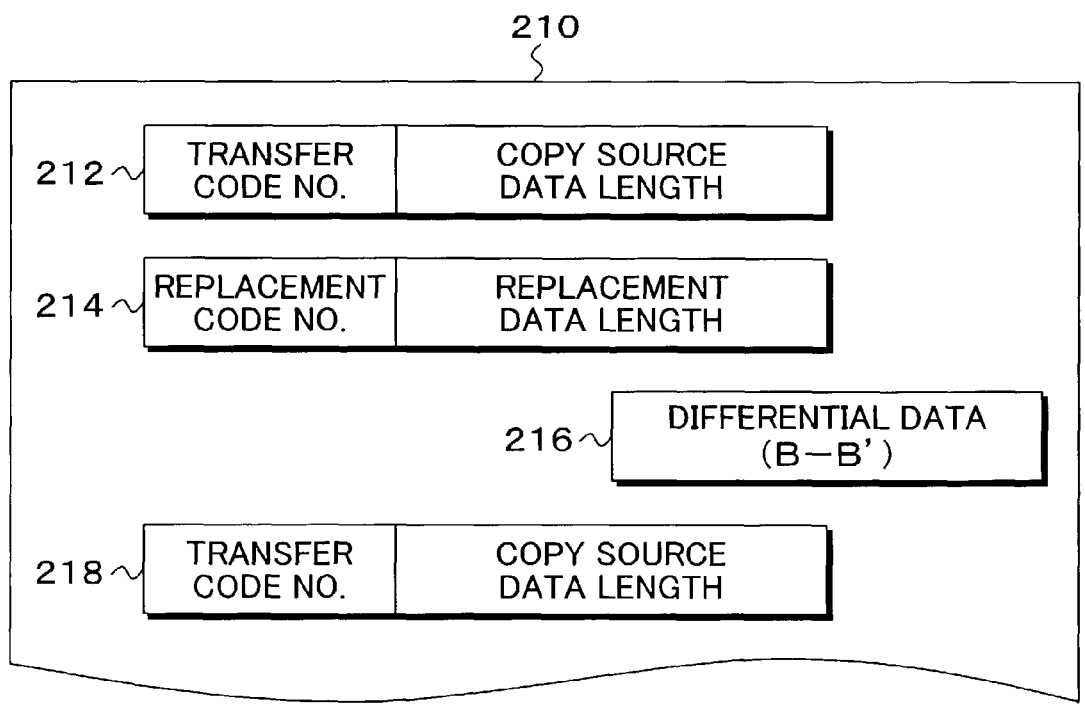
Figure 3A:
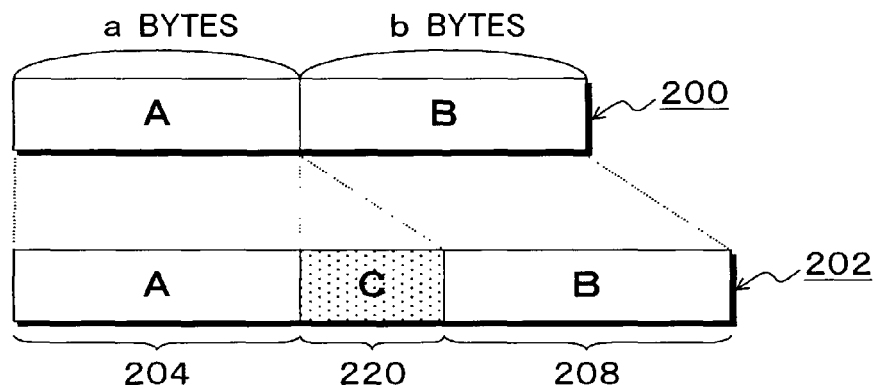
FIGS. 3A and 3B are explanatory diagrams of a conventional inserting process.
Figure 3B:
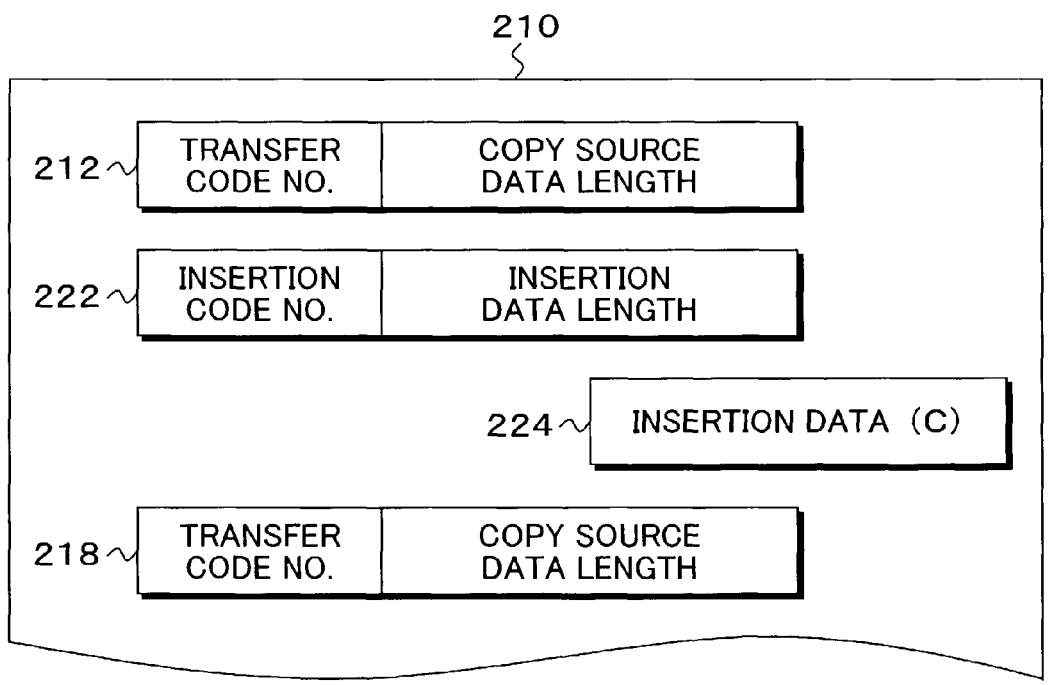
Figure 4A:
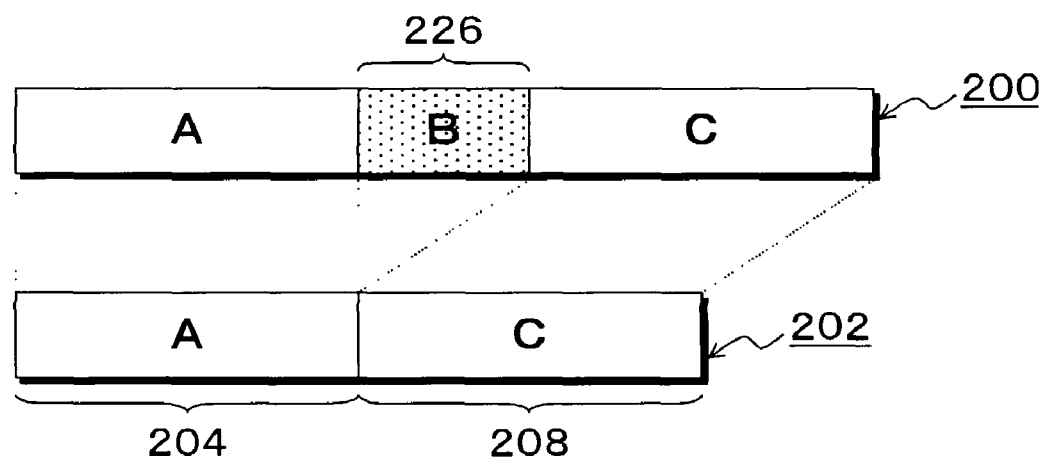
FIGS. 4A and 4B are explanatory diagrams of a conventional deleting process.
Figure 4B:
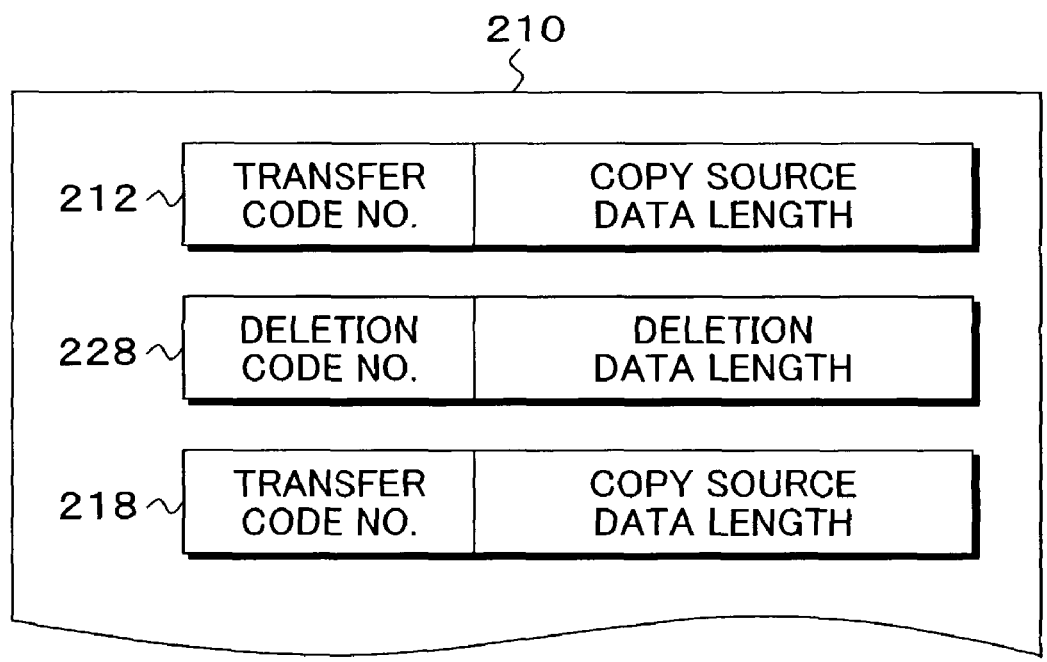
Figure 5:
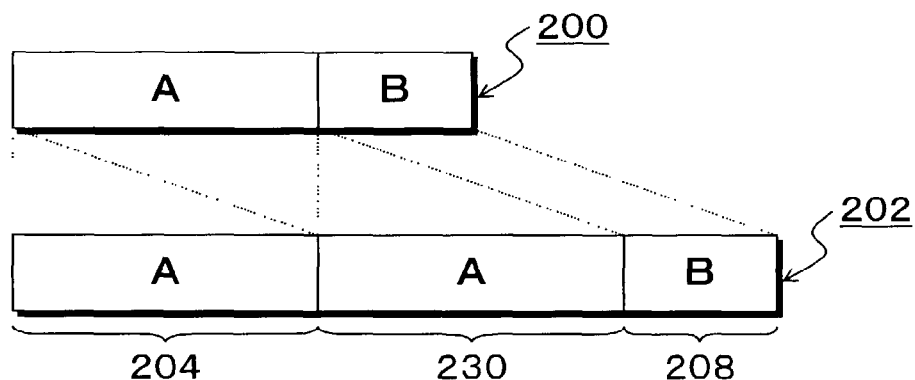
FIG. 5 is an explanatory diagram of new and old file patterns that do not belong to conventional categories "replacement", "insertion", and "deletion"

FIG. 7 is a block diagram of a functional construction of a data synchronization apparatus according to the present invention. An old file 10 and a new file 12 are prepared as input files for the data synchronization apparatus. The data of both files is read out by a data reading unit 14 and supplied to a differential data extracting unit 15. In the embodiment, for example, it is assumed that program files described by 32-bit codes (4-byte codes) are handled as an old file 10 and a new file 12. A data comparing unit 16, a transfer information forming unit 18, a matching portion search unit 20, a shift information forming unit 22, and a replacement information forming unit 24 are provided for the differential data extracting unit 15. The data comparing unit 16 sequentially compares the new file and the old file, which are read out from the old file 10 and the new file 12 by the data reading unit 14 from the heads of the files on a predetermined data unit basis, in the embodiment, on a one byte unit basis. If a match between the new file and the old file data is determined by the data comparison of the byte unit by the data comparing unit 16, the transfer information forming unit 18 forms a transfer code indicative of a position and a data length of the matching old file and outputs it.

Figure 8A:
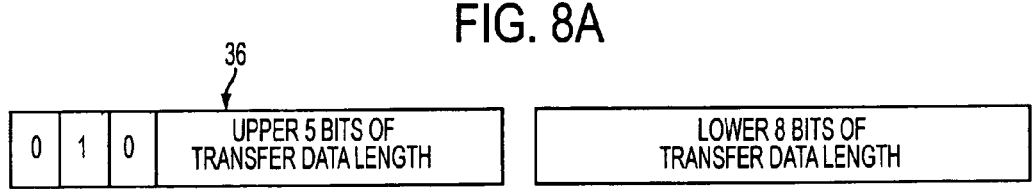
FIGS. 8A to 8E are explanatory diagrams of differential control codes which are formed by the present invention.

The transfer code formed by the transfer information forming unit 18 has a format construction of FIG. 8A. A transfer code 36 is a code of 2 bytes, a code number "010" indicative of the transfer code 36 has been stored in head 3 bits of the first byte, and a transfer data length has been stored by using residual 5 bits of the first byte and 8 bits of the second byte.

Referring again to FIG. 7, if a data mismatch between the new file and the old file, which are compared on a byte unit basis by the data comparing unit 16, is determined, the matching portion search unit 20 searches the old file in both forward and backward directions from the data position where the mismatch has been determined in the old file, thereby searching a portion which matches with the data of the new file. In this case, if the old file is searched in both the forward and backward directions on a byte unit basis, since it takes time to process, the data of the new file is compared with the data of the old file less often, for example, every other 4 bytes. If the matching byte portion is found by searching the old file every other 4 bytes, then it is determined that the matching portions could be searched by match determination of two stages which satisfy one of the following conditions.

(1) If the matching portions of a length of a predetermined number (n) of bytes or more, for example, n=16 bytes or more subsequent to the portion in the old file which matches with the 1-byte data of the new file have continuously been searched, then it is determined that the data matches.

(2) If the matching portions of another predetermined number (y) of bytes or more, for example, y=32 bytes or more distributed in a predetermined number (x) of bytes data or more, for example, x=64 bytes subsequent to the portion in the old file which matches with the 1-byte data of the new file have been searched, then it is determined that the data matches.

The reasons why the old file is searched in both the forward and the backward directions from the mismatching position and after the match of the 1-byte portion is obtained is because the matching portion is determined at two stages on the basis of one of the conditions (1) and (2), as mentioned above, to certainly execute the match determination in the differential data extracting process of the new and old files and to reduce a data amount by decreasing redundancy of the differential data by increasing an opportunity of a replacing process as much as possible in the differential data extracting process. If the matching portion could be searched by searching the old file in both the forward and backward directions from the mismatching position of the old file by the matching portion search unit 20, then the shift information forming unit 22 forms a shift code indicative of shift information in a range from the mismatching portion to the matching portion on the old file and outputs it. The shift code has a shifting direction in which the forward position on the old file is set to the negative direction and the backward position on the old file is set to the positive direction and a shift length showing a length of data in a range from the mismatching portion to the matching portion on the old file.

Figure 8B:
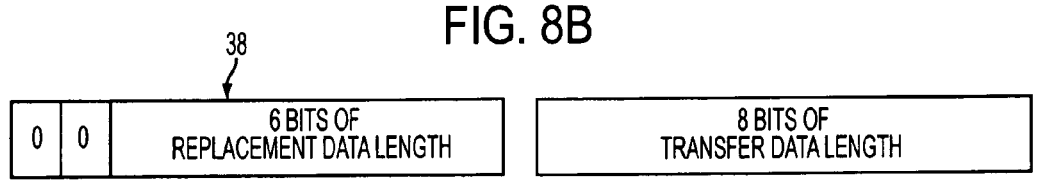
Figure 8C:
Figure 8D:
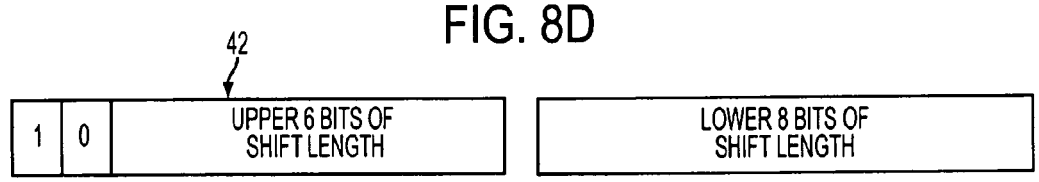
Figure 8E:
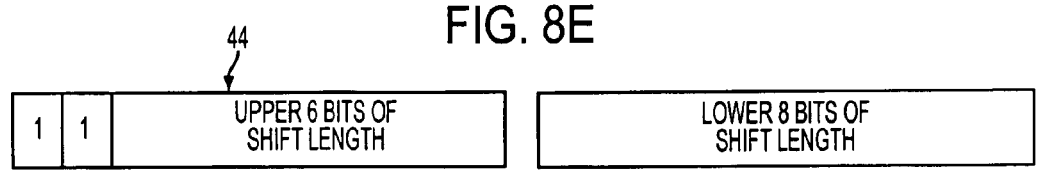

Specifically speaking, a negative shift code 42 in FIG. 8D or a positive shift code 44 in FIG. 8E is formed and output. Each of the negative shift codes 42 and the positive shift codes 44 are code information of 2 bytes in a manner similar to the transfer code 36 in FIG. 8A. With respect to head 2 bits of the first byte, in the negative shift code 42, a code number "10" has been stored, and after that, the shift length on the old file has been stored by using the remaining 6 bits of the first byte and 8 bits of the second byte. In a manner similar to the above, in the positive shift code 44 in FIG. 8E, a code number "11" indicative of a positive control code has been stored in head 2 bits of the first byte, and after that, the shift length has been stored by using remaining 6 bits of the first byte and 8 bits of the second byte.

Referring again to FIG. 7, when the matching portion cannot be searched by the matching portion search unit 20, the replacement information forming unit 24 adds new data in the mismatching portion to a transfer replacement code showing the data length of the mismatching portion of the old file at a position until the matching portion can be found and outputs the resultant transfer replacement code. The transfer replacement code which is formed and output by the replacement information forming unit 24 is a control code of 2 bytes as shown in FIG. 8B, a code number "00" indicative of a transfer replacement code 38 has been stored in 2 bits of the first byte, a replacement data length has been stored in the remaining 6 bits subsequent to the code number, and a transfer data length (transfer data length at a position until the replacement occurs) has been stored in 8 bits of the second byte.

When replacement information is formed, the replacement information forming unit 24 of the present invention determines whether replacement information having a difference of the same value has been formed by the differential data extracting process so far or not. If the replacement information having the difference of the same value is formed, the replacement information forming unit 24 does not form new data but forms a transfer increase code 40 in FIG. 8C as replacement information indicative of the existence of the existing differential information and outputs it. The transfer increase code 40 is a control code of 2 bytes, a code number "011" indicative of the transfer increase code has been stored in head 3 bits of the first byte, a transfer data length has been stored by using remaining 5 bits subsequent to the code number and 8 bits of the second byte. That is, if the value of the difference of the replacing process is equal to the first value which did not exist in the past, the replacement information forming unit 24 of the present invention generates the transfer replacement code 38 in FIG. 8B, adds new data thereto, and outputs the resultant transfer replacement code. In the case of the second and subsequent times in which the value of the difference has the same value in the past, the transfer increase code 40 in FIG. 8C is formed and output. In this case, there is no need to add the new data. Therefore, in the case where a plurality of differential patterns having the same difference appear, then it is sufficient to add the new data only once and there is no need to add the new data after that. Thus, the redundancy of the differential data can be reduced and an amount of differential data can be decreased.

The control code in each of the transfer information, the shift information, and the replacement information formed by the differential data extracting unit 15 in FIG. 7 is generated as a control code 30 by a control code writing unit 26 and generated into a differential data file 35 by a differential data writing unit 34. The new data generated in association with the creation of the transfer replacement code 38 in FIG. 8B in the replacement information forming unit 24, that is, the updating data is generated as updating data 32 by an updating data writing unit 28 and written into the differential data file 35 via the differential data writing unit 34.

Figure 9:
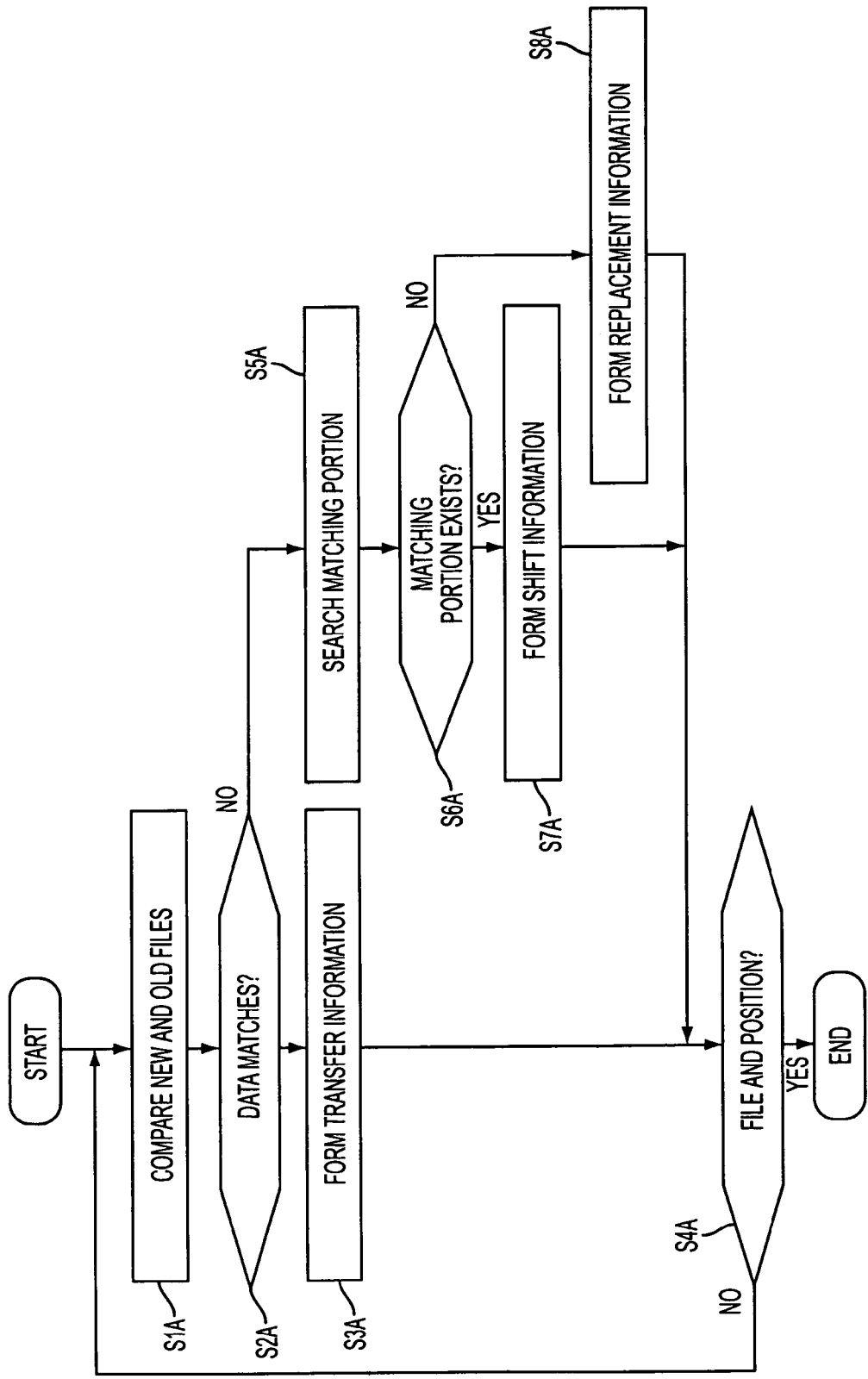
FIG. 9 is a schematic flowchart for a data synchronization process of the present invention.

FIG. 9 is a schematic flowchart for a data synchronization process according to the present invention corresponding to the differential data processing apparatus of FIG. 7. In step S1A, the new and old files are read and compared, for example, on a byte unit basis. If a match of the 1-byte data of the new and old files is determined in step S2A, transfer information (transfer code) is formed in step S3A. If the data match is not obtained in step S2A, that is, in the case of a mismatch, portions before and after the mismatching portion in the old file corresponding to the 1-byte data in the new file are searched, thereby searching the matching portion in step S5A. As for the matching portion, after the match is obtained by searching the portions before and after the mismatching portion in the old file and when the continuous matching of n=16 bytes or more subsequent to the matching 1-byte data or the matching of 32 bytes or more in x=64 bytes subsequent to one byte is obtained, then it is determined that the data matches. If the matching portion is obtained with respect to the search result about the matching portion in step S6A, shift information (positive shift code or negative shift code) is formed in step S7A. If there is no matching portion, a replacement information forming process is executed in step S8A. In the case where the value of the difference is equal to the value obtained in the beginning, the replacement information forming process: generates the transfer replacement code 38 in FIG. 8B, adds new data obtained after the updating thereto, and outputs the resultant transfer replacement code. In the replacement of the second and subsequent times in which the value of the difference has the same value, the transfer increase code 40 in FIG. 8C is formed and output. Thus, there is no need to add the new data. Such processes are repeated up to a file end position in step S4A.

Figure 10:
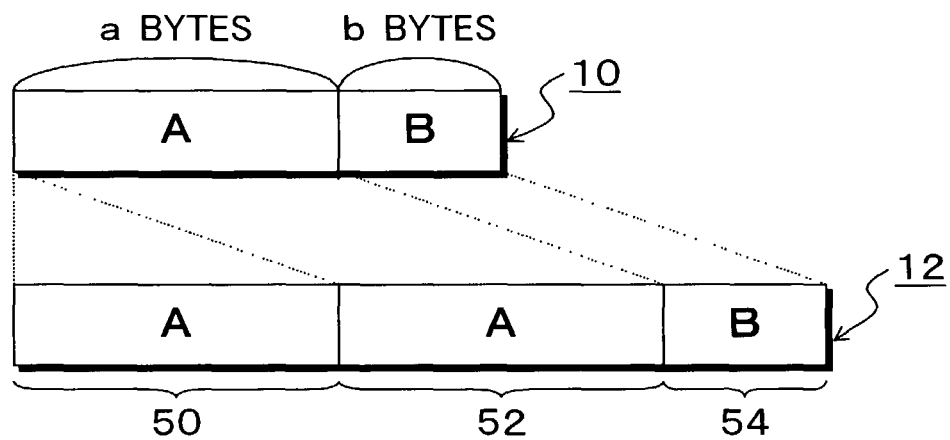
FIG. 10 is an explanatory diagram of new and old file patterns that can be processed by the present invention.

FIG. 10 shows an example of new and old file patterns that cannot be processed by the conventional method but can be processed by the data synchronization process of the present invention. The old file patterns are the data A and B in the old file 10. They are updated to the new file patterns A, A, and B in the new file 12. In the new file 12, a matching portion 52 of the data A is newly added with respect to a matching portion 50 of the data A and a matching portion 54 of the data B is finally added.

Figure 11:
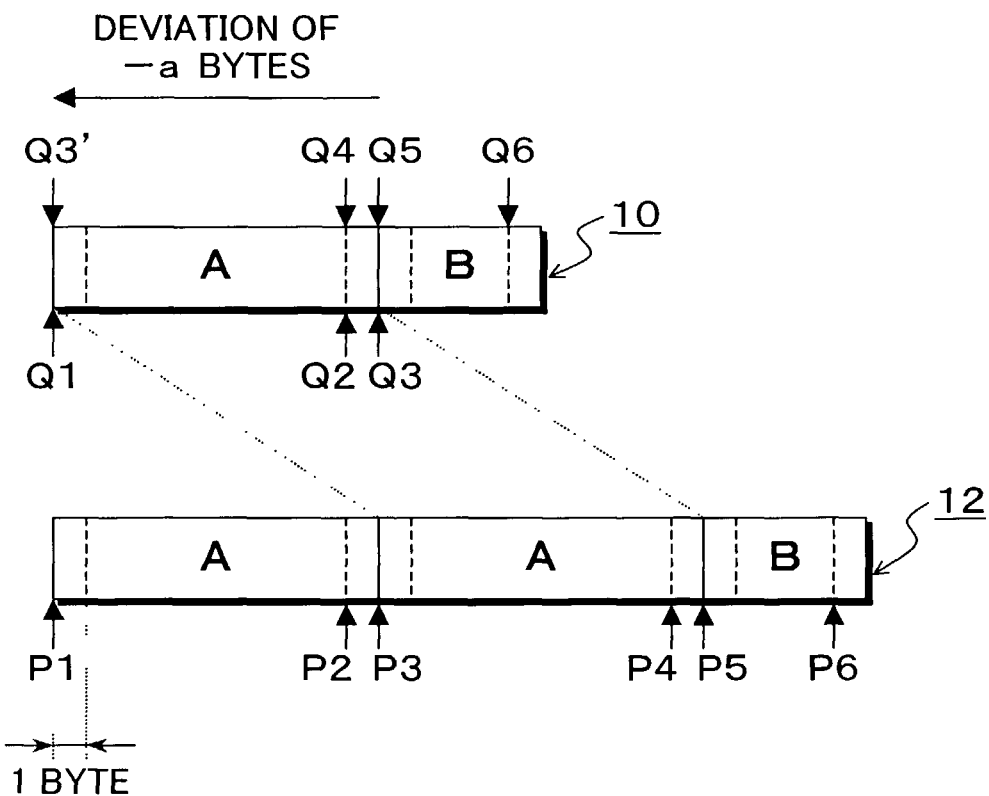
FIG. 11 is an explanatory diagram of a data synchronization process by pointer control of the present invention for new and old file patterns in FIG. 10 as targets.

FIG. 11 shows a specific processing procedure of the data synchronization process according to the present invention for the new and old file patterns in FIG. 10 as targets. In the data synchronization process according to the present invention, a data comparison target pointer P is set into the new file 12. In response to the setting of the data comparison target pointer P in the new file 12, a data reference pointer Q is set into the old file 10. The data synchronization process is executed by the control of the positions of the pointers P and Q. In the following description, the data comparison target pointer P and the data reference pointer Q are simply referred to as pointers with numbers are added to those pointers (i.e. (P1, P2, P3) or (Q1, Q2, Q3)) in control order of the pointers. Further, data lengths of the data A, B, and C are assumed to be (a) bytes, (b) bytes, and (c) bytes, respectively.

In FIG. 11, first, the pointers P1 and Q1 are set to the heads of the new file 12 and the old file 10, respectively, and the 1-byte data shown by a broken line is compared. In this case, since the data A is the matching portion 50, the 1-byte data matches as a result of the first 1-byte comparison. Therefore, when the match is obtained, the pointers P1 and Q1 are shifted to the next positions deviated by one byte, and the 1-byte data is compared. Thus, with respect to the data A in the new file 12 and the old file 10, the result of the byte matching is obtained up to P2 and Q2. Subsequently, with respect to the new file 12 and the old file 10, the pointers are shifted to the pointers P3 and Q3 and the next one byte is compared. In this case, it is the head byte of each of the data portions A and B and the 1-byte data does not match. If the mismatch is obtained by the comparison of the 1-byte data as mentioned above, in the present invention, the pointer is shifted to the positions before and after the pointer Q3 as a mismatching position in the old file 10, and the matching portion with the 1-byte data of the pointer P3 in the new file 12 is searched. In the search of the matching portions at the positions before and after the pointer Q3 at the mismatching position in the old file 10, for example, the 1-byte data of the old file 10 is extracted every other 4 bytes and compared. By this search, the head one byte in the forward data A in the old file 10 matches with one byte of the pointer P3 in the new file 12. If the matching portion is determined from the old file 10 by the search of the matching portions before and after the mismatching position, the pointer Q3 is shifted to a pointer Q3' of the matching portion. The comparison is sequentially performed on a byte unit basis from the 1-byte data of the pointer P3 of the new file 12 and one byte of Q3' of the old file shifted by the search. In this case, since both data portions are the data A, the data match of the byte unit is obtained up to the pointers P4 and Q4. Subsequently, when the pointer is shifted to P5 and Q5 and the head bytes of the data B are compared, also in this case, the data match is obtained and this data match continues up to the last pointers P6 and Q6.

Figure 12:
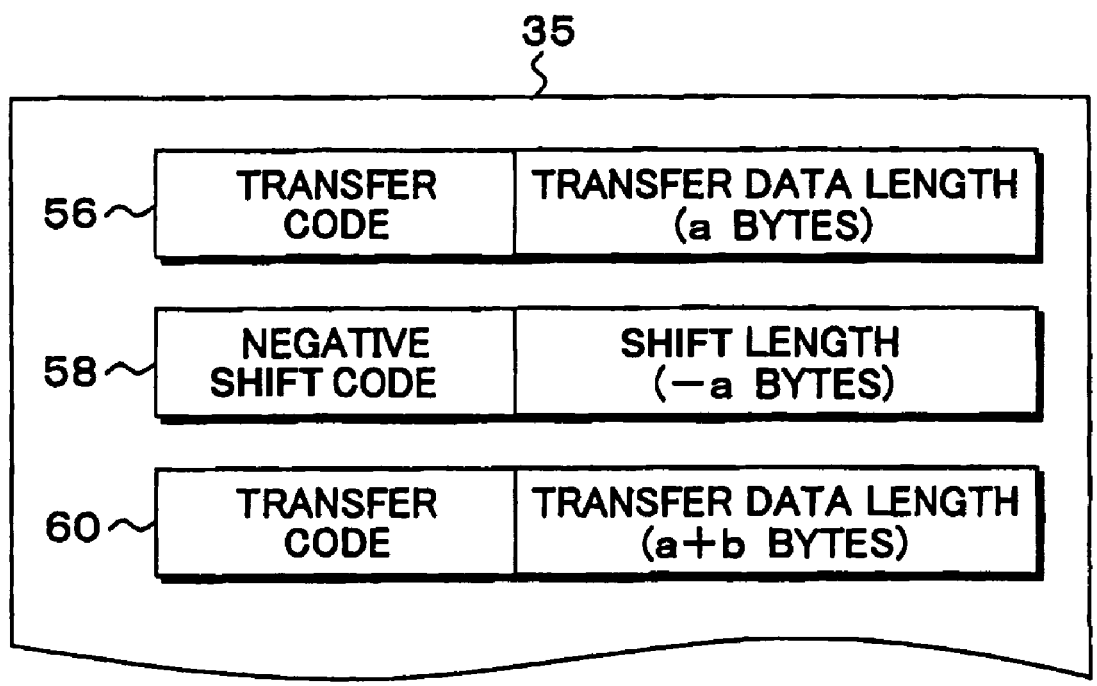
FIG. 12 is an explanatory diagram of a differential data file formed by the process in FIG. 11.

By the extracting process of the differential data by the control of the pointer in FIG. 11, as mentioned above, a transfer code 56, a negative shift code 58, and a transfer code 60 as shown in the differential data file 35 in FIG. 12 are formed and output. First, within the head data A in the new and old files in FIG. 11, the transfer code 56 in which code contents have (a) bytes as a data length of the data A is formed. Subsequently, the negative shift code 58, is formed due to the mismatching portion of the 1-byte data of the pointers P3 and Q3. The negative shift code 58 shows the shift from the pointer Q3 to Q3' at the time when the match with the head byte of the data A is obtained by the search of the portions before and after the mismatching portion in the old file 10. Since the negative shift code 58 indicates the shift in the negative direction of the pointer Q3 shift to the forward pointer Q3', the negative shift code 58 is formed, and the value of −a bytes, showing a deviation amount of the pointer, is stored as a shift length. Lastly, the transfer code 60 indicative of the match between the second data A and the last data B in the new file 12 and the data A and B in the old file 10 is formed and output. In this case, the transfer data length is equal to (a+b) bytes, which is obtained by adding byte lengths (a) and (b) of data (a) and (b).

Figure 13:
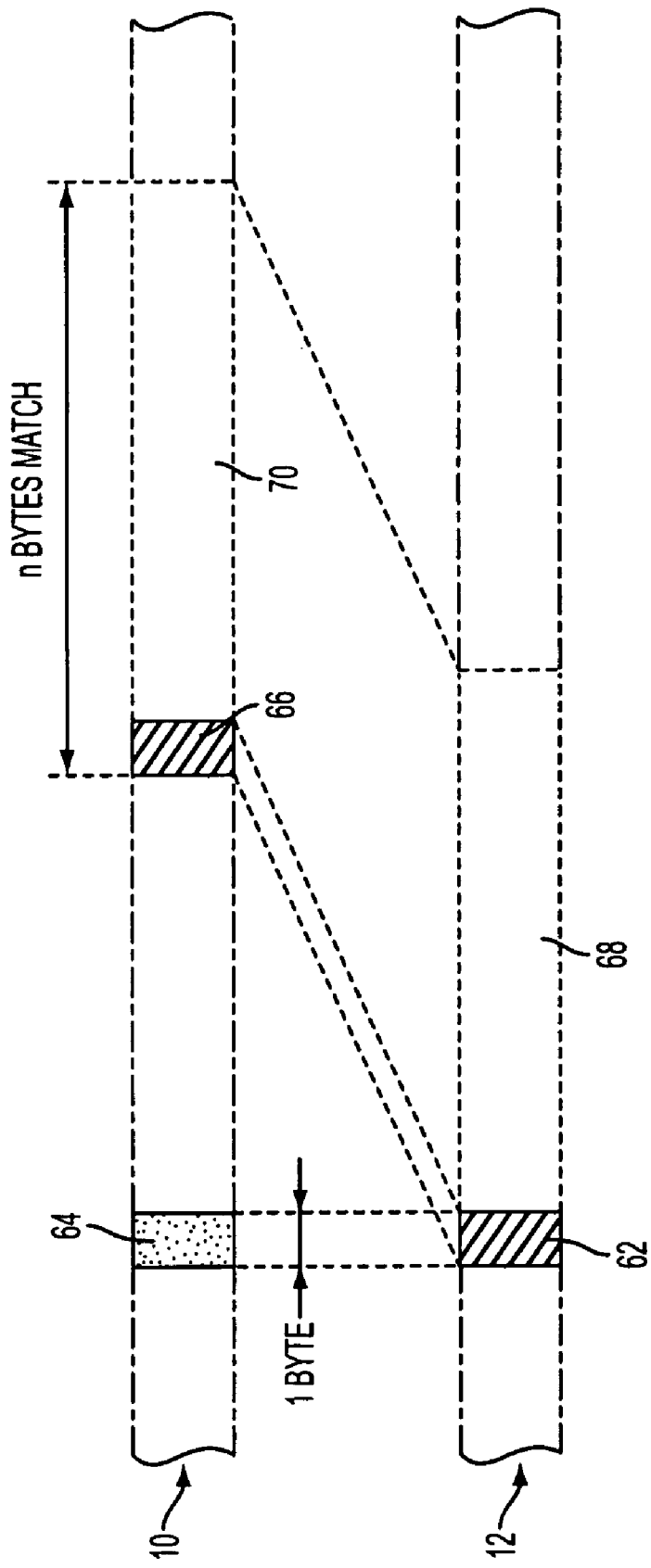
FIG. 13 is an explanatory diagram of a matching portion 2-stage determination in the present invention.

FIG. 13 shows a specific example of a match determination at the second stage. The match determination at the second stage is subsequently executed in the case where: the 1-byte data does not match at the pointers P3 and Q3 in FIG. 11, the old file 10 is searched in the forward and backward directions, and the 1-byte data matches with the head 1-byte data of the forward data A. That is, FIG. 13 corresponds to the case where: the 1-byte data 62 of the new file 12 and 1-byte data 64 of the old file 10 do not match, the old file is searched backward, and the match with 1-byte data 66 is searched. In this case, as a data portion 70 subsequent to the searched 1-byte data 66, if it matches with a data portion 68 of the new file 12 by n=16 bytes or more, then it is determined that the matching portions could be searched.

Figure 14:
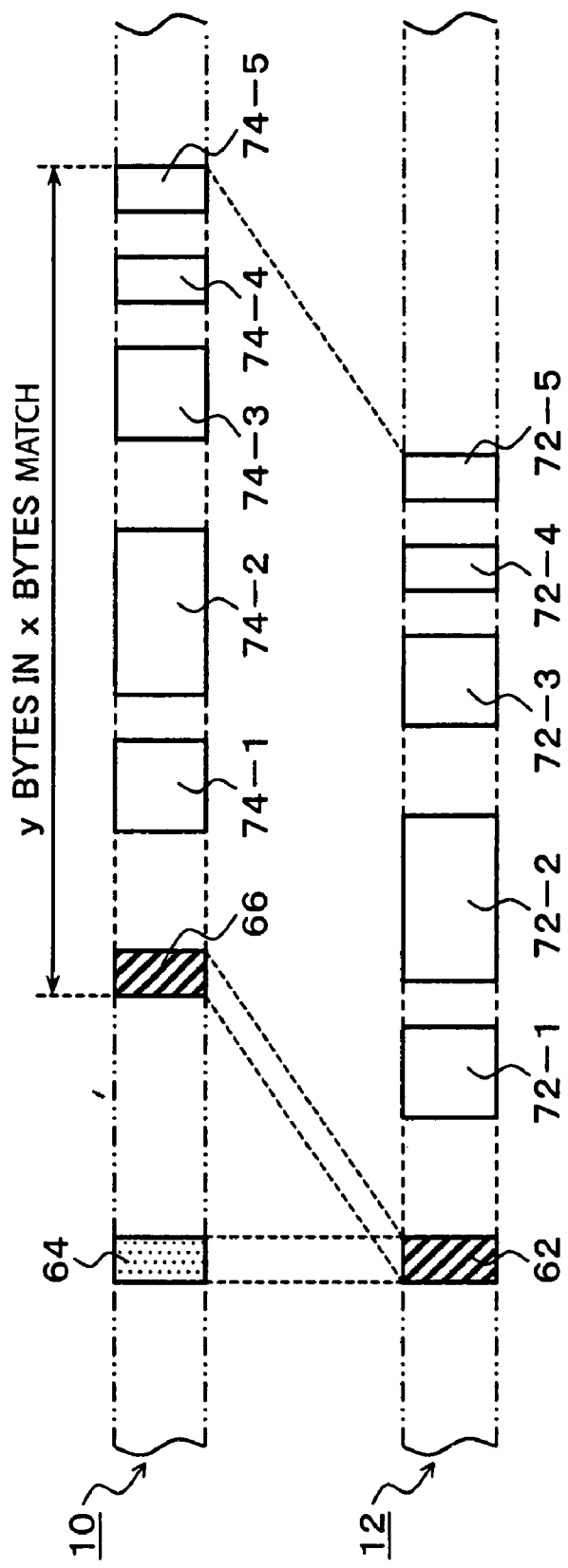
FIG. 14 is an explanatory diagram of another matching portion 2-stage determination in the present invention.

FIG. 14 is an explanatory diagram of another matching portion determining process of two stages in the match search. ? In this case, where a match with the 1-byte data 66 is determined by searching the backward portion of the 1-byte data 62 of the new file 12, if the portions of y=32 bytes or more in x=64 bytes subsequent thereto match, that is, when the total number of bytes of matching portions of data portions 72-1 to 72-5 and 74-1 to 74-5 in the new and old files 12 and 10 subsequent to the matching 1-byte data 62 and 66 are equal to y=32 bytes or more, then it is determined that the matching portions could be searched. As mentioned above, when one of the matching conditions in FIG. 13 or 14 is satisfied, then it is determined that a deviation occurred between the matching positions in the new file 12 and the old file 10, thereby generating the negative shift code 42 in FIG. 8D or the positive shift code 44 in FIG. 8E in accordance with the direction of the deviation. By the generation of the negative shift code 42 or the positive shift code 44, which are indicative of the occurrence of the deviation, a process, which is executed after the pointer is shifted by the deviation amount on the old file 10, becomes the differential data extracting process by the comparison of the byte unit from the pointer position which was deviated again.

Figure 15:
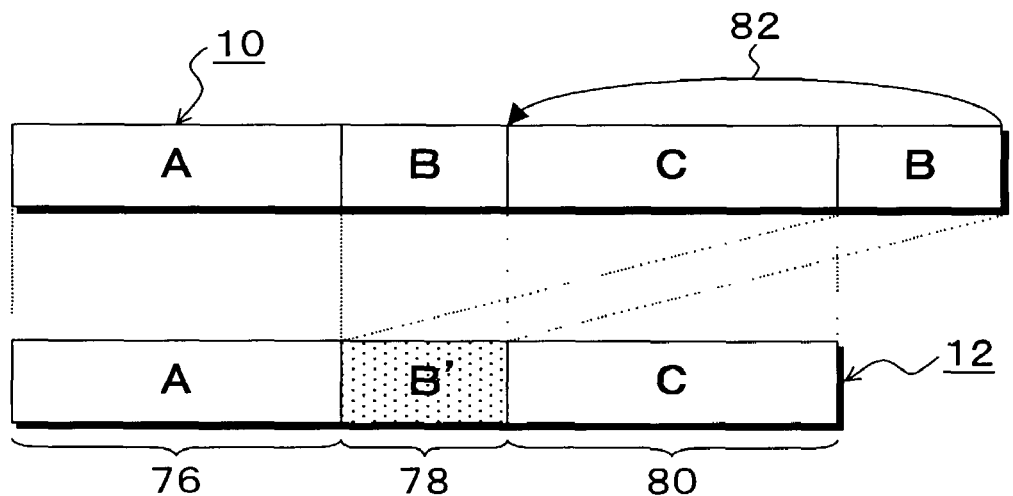
FIG. 15 is an explanatory diagram of new and old file patterns in the case where an updating portion to be processed in the present invention is erroneously determined.

FIG. 15 is an explanatory diagram of new and old file patterns, which can be processed in the present invention in the case where an updating portion is erroneously determined. The old file 10 is constructed by data A, B, C, and B. On the other hand, the new file 12 obtained after the updating is constructed by data A, B, and C. Data A, B, and C of the new file 12 are matching portion 76, matching portion 78, and matching portion 80, respectively. If the data synchronization process is normally executed, since all of the data A, B, and C is the matching portions, then it is sufficient to form and output a transfer code of (a+b+c) bytes corresponding to a transfer data length. However, it is now assumed that an erroneous determination was made in the process of the second data B, and the data of the new file 12 was erroneously determined to be B' for the data B of the old file 10. With respect to such an erroneous determination where the data B was erroneously determined to be the data B' as mentioned above, according to the conventional data synchronization method, since the data differs, the replacing process forms the differential data. Consequently, the result of the erroneous discrimination is inherited as wrong data and used in the subsequent updating of the old file 10. According to the present invention, however, if the data B was erroneously determined as data B', since the data does not match, the old file 10 is searched in the forward and backward directions of the data B serving as a mismatching portion in the old file 10. In this case, the data B which matches by the backward search is found as a matching portion, and the pointer is shifted to the head of the data B behind the old file 10. The differential data extracting process is executed, so that a transfer code to transfer the data B at the end of the old file 10 is formed. Thus, the data of a portion 78, which was erroneously determined, is first updated to a correct data. The pointer shifted from the erroneously determined portion 78 to the data B behind the old file 10 is contrarily returned to the head of the data C by a pointer shift 82 in the negative direction after completion of the differential data extracting process of the data B, and a transfer code, where the data C is set to a matching portion 80, is formed and output.

Figure 6:
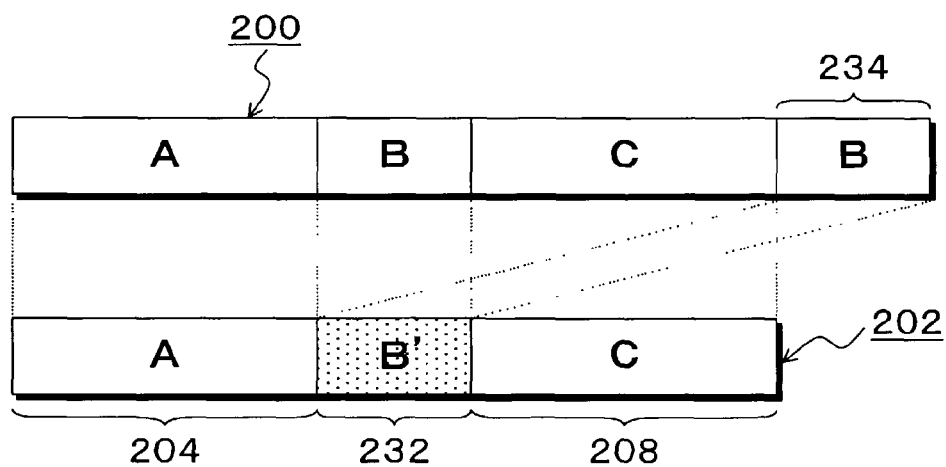
FIG. 6 is an explanatory diagram of new and old file patterns in which a correspondence relation of updating portions is wrong and which cannot be solved by a conventional method.
Figure 16:
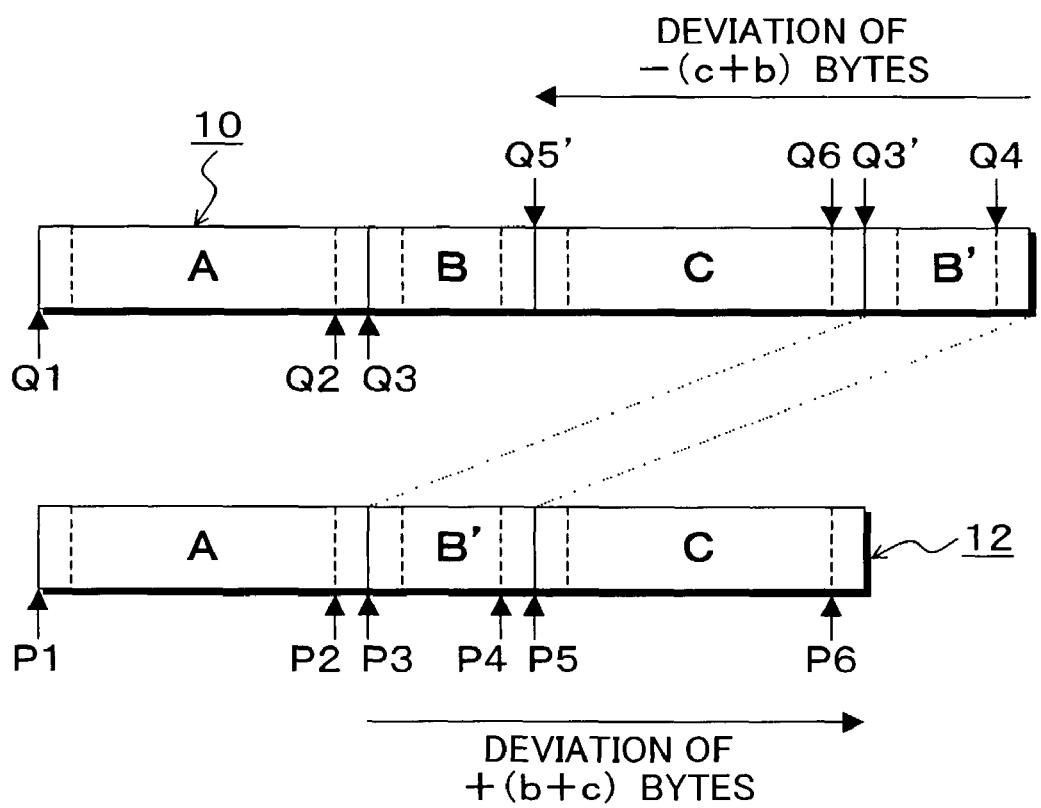
FIG. 16 is an explanatory diagram of a data synchronization process by pointer control of the present invention for new and old files in FIG. 15 as targets.
Figure 17:
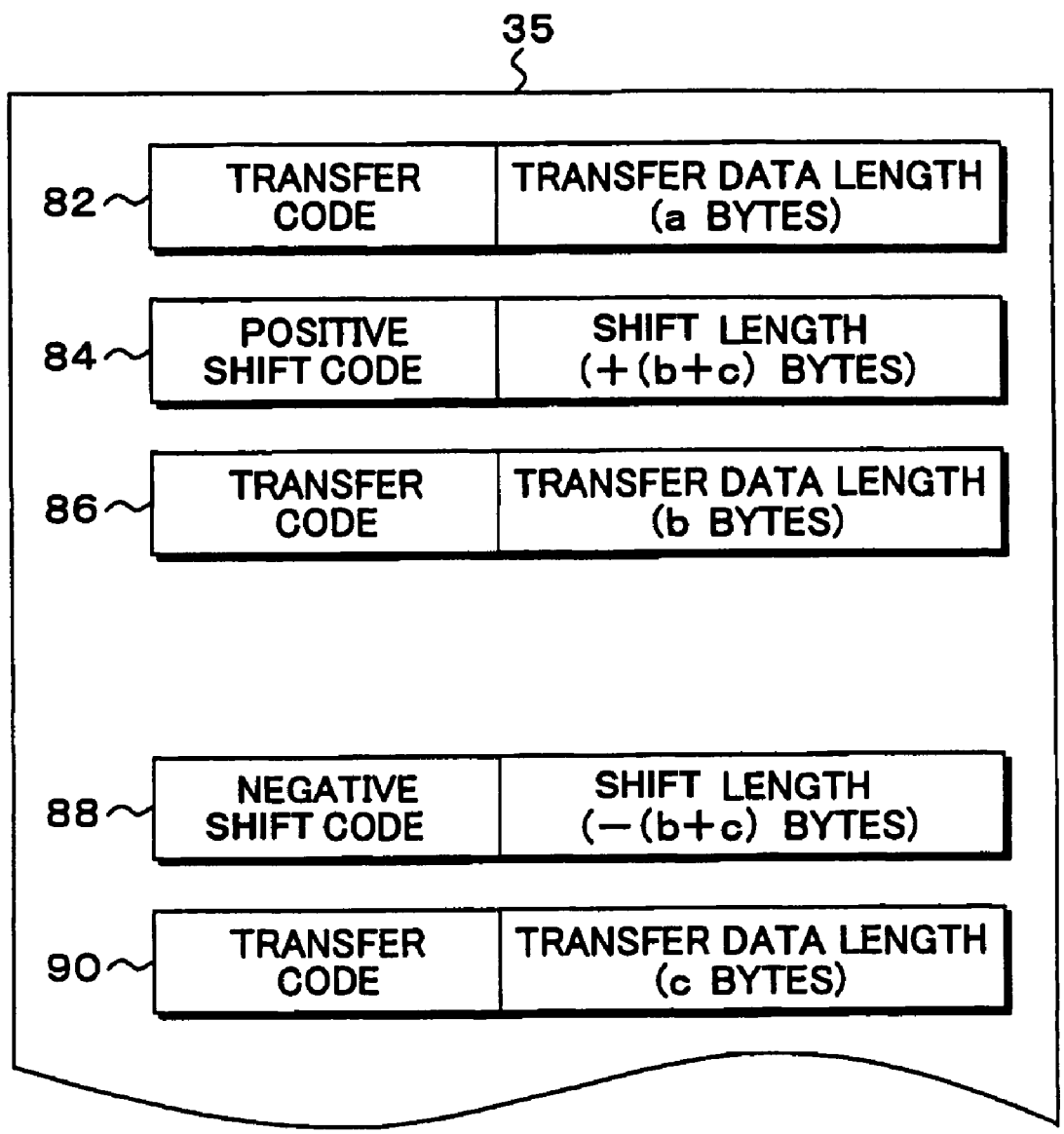
FIG. 17 is an explanatory diagram of a differential data file formed by the process in FIG. 16.

FIG. 16 is an explanatory diagram according to pointer control of a data synchronization process of the present invention for new and old files in the case where the erroneously determined portion 78 in FIG. 15 is included. Processes of the portion between the pointers P1 and P2 and between the pointers Q1 and Q2 corresponding to the data A in the new and old files 12 and 10 are substantially the same as those in the case of FIG. 6 (the transfer code is generated). When the first byte of the data B' is compared with the data B of the old file 10 of the pointer Q, they are erroneously determined to be mismatching due to the shift of the pointer P3. Due to such an erroneous determination, according to the present invention, the search is performed in the forward and backward directions for the pointer Q3 of the mismatching portion. In this case, since the erroneously determined data B' of the old file 10 is actually the data B, the data matches by the search of first byte of the last data B of the old file 10. At this time, assuming that the matching condition at the second stage in FIG. 13 or 14 is satisfied, the following action are completed: the portion that matches with the data B is determined, the pointer Q3 of the old file 10 is shifted to Q3', and in association with it, a positive shift code 84 shown in the differential data file 35 in FIG. 17, in which +(c+b) bytes as a deviation from the pointer Q3 have been stored, is generated. Subsequently, a match of the data B is determined due to the shift of the pointers P3 to P4 of the new file 12 and the shifted pointers Q3' to Q4 of the old file 10, and a transfer code 86 of (b) bytes of the transfer data length in FIG. 17 is formed. Subsequently, even when the pointer P5 of the new file 12 is compared with the end pointer Q5 of the old file 10, they do not match. Therefore, since the data exists only in the forward and backward directions of the pointer Q5, in this case, only in the forward direction, a match with the first byte of the data C is determined by searching the old file in the forward direction. Owing to the match of the 1-byte data, when the match conditions of FIG. 13 or 14 are subsequently obtained, the data is determined to be the matching portion and the pointer Q5 is shifted to Q5'. To show such a shift of the pointer, a negative shift code 88 in FIG. 17, in which a shift length of −(c+b) bytes has been stored, is generated. By the match of the data C due to the shift of the pointers P5 to P6 of the new file 12 and the shifted pointers Q5' to Q6 of the old file 10, a transfer code 90 of (c) bytes as a transfer data length in FIG. 17 is generated. As mentioned above, in the data synchronization process of the present invention, it is possible to properly cope with the new and old file patterns which cannot be coped by the categories "replacement", "deletion", and "insertion" in the conventional data synchronization method. Even if the replacement position was erroneously determined the differential data of the erroneously determined portion can be corrected by the subsequent processes by again referring to the portion of the old file which was once referred to.

Figure 18:
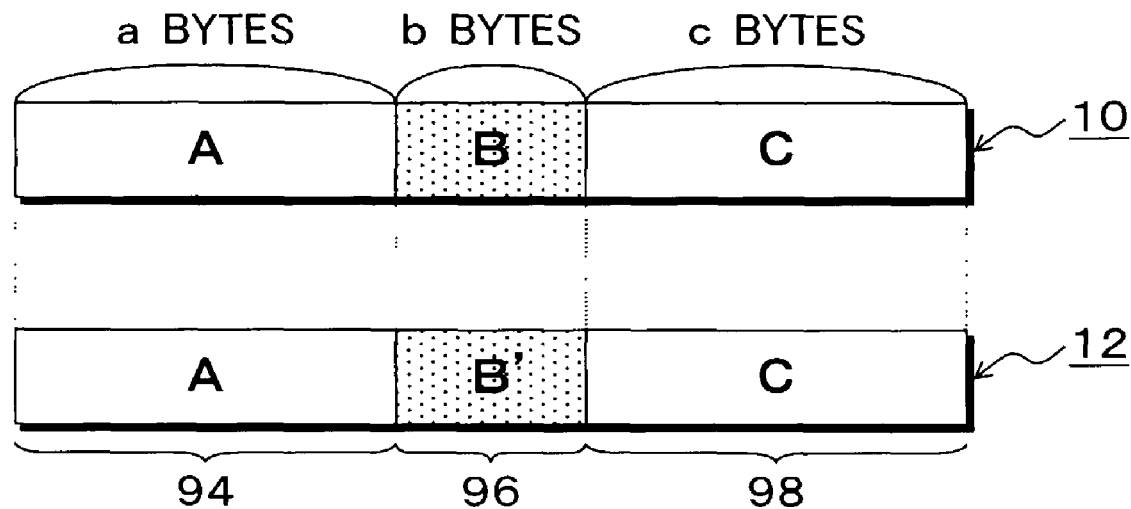
FIG. 18 is an explanatory diagram of new and old file patterns to which a replacing process is executed in the present invention.

FIG. 18 shows the new and old file patterns having an updating portion. In the new and old file patterns, the old file 10 is constructed by data A, B, and C and the new file 12 is constructed by data A, B', and C. There are the matching portions of the data A 94 and C 98 and the portions of the data B and B' become replacement data 96.

Figure 19:
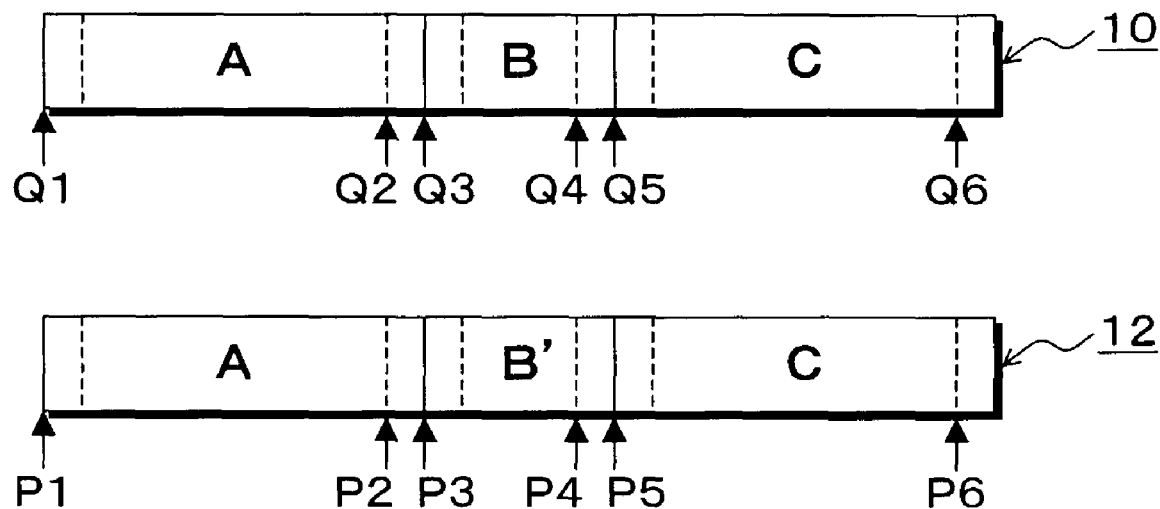
FIG. 19 is an explanatory diagram of the data synchronization process by the pointer control of the present invention for new and old files in FIG. 18 as targets.
Figure 20:
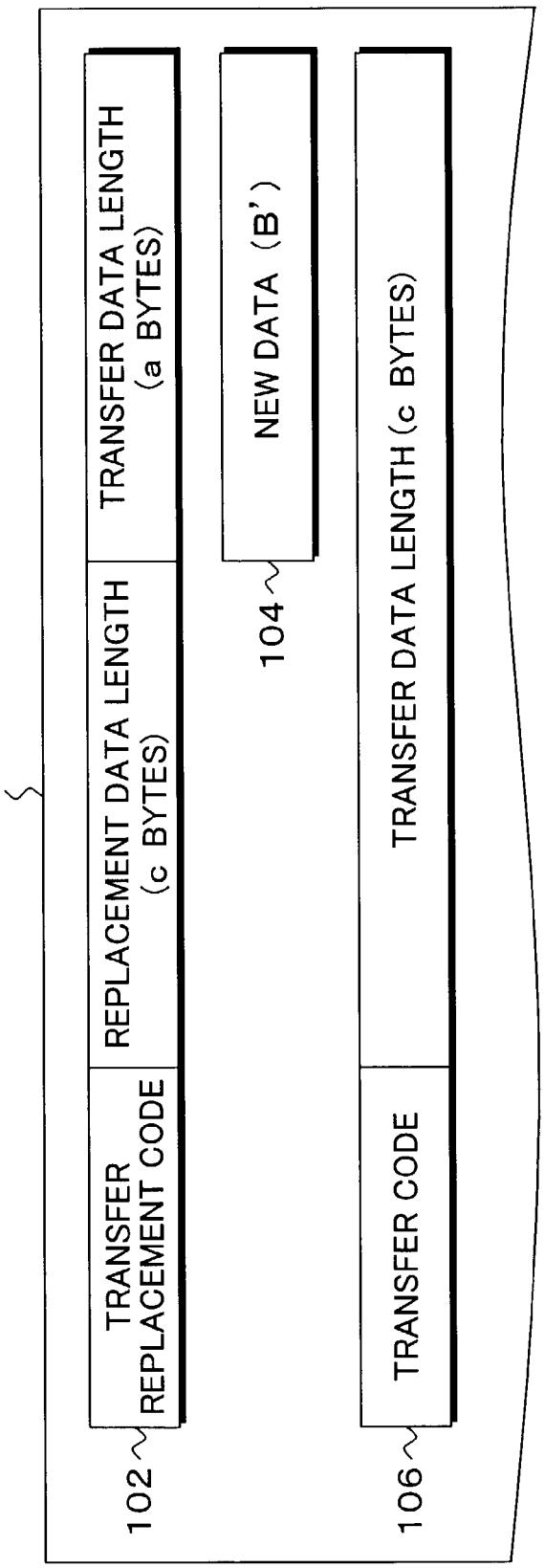
FIG. 20 is an explanatory diagram of a differential data file formed by the process in FIG. 19.

FIG. 19 shows a specific example by the pointer control of the data synchronization process of the present invention for the new and old file patterns in FIG. 18. In the head data A of the new and old files of FIG. 19, a match of the data A is determined by control of the pointers P1 to P2 and the pointers Q1 to Q2. Subsequently, the first byte of each of the data B and B' is compared due to the shift to the pointer P3 of the new file 12 and the pointer Q3 of the old file 10. In this case, the data does not match due to the updating. Due to the mismatch of the 1-byte data, even if the old file is searched in the forward and backward directions of the old file 10, the matching portion cannot be obtained. Therefore, the pointers P3 and Q3 are shifted backward one byte by one and this process is repeated up to the pointers P4 and Q4. Further, when the pointers are shifted to the pointers P5 and Q5, the first byte of the next data C is compared and the data is determined to be the matching portion. At the same time, since the match condition of the second stage of FIG. 13 or 14 is satisfied, the data is determined to be the matching portion. Therefore, with respect to the data B and B' serving as replacement portion at this point of time, a transfer replacement code 102 of (c) bytes, as a replacement data length and (a) bytes as a transfer data length in FIG. 20, is generated. At this time, a value of a difference (B−B') is obtained. Since this difference value (B−B') is a value which does not match with a value of the differential data of the past replacement code and appears for the first time, the transfer replacement code 102 is formed, new data 104 having a value of B' is added to the code 102, and the resultant code is output. In FIG. 19, the matching portion of the data C is determined by the shift of the pointers P5 to P6 in the new file 12 and the shift of the pointers Q5 to Q6 in the old file 10 synchronized therewith. A transfer code 106 with a (c) byte transfer data length in FIG. 20 is formed.

Figure 21:
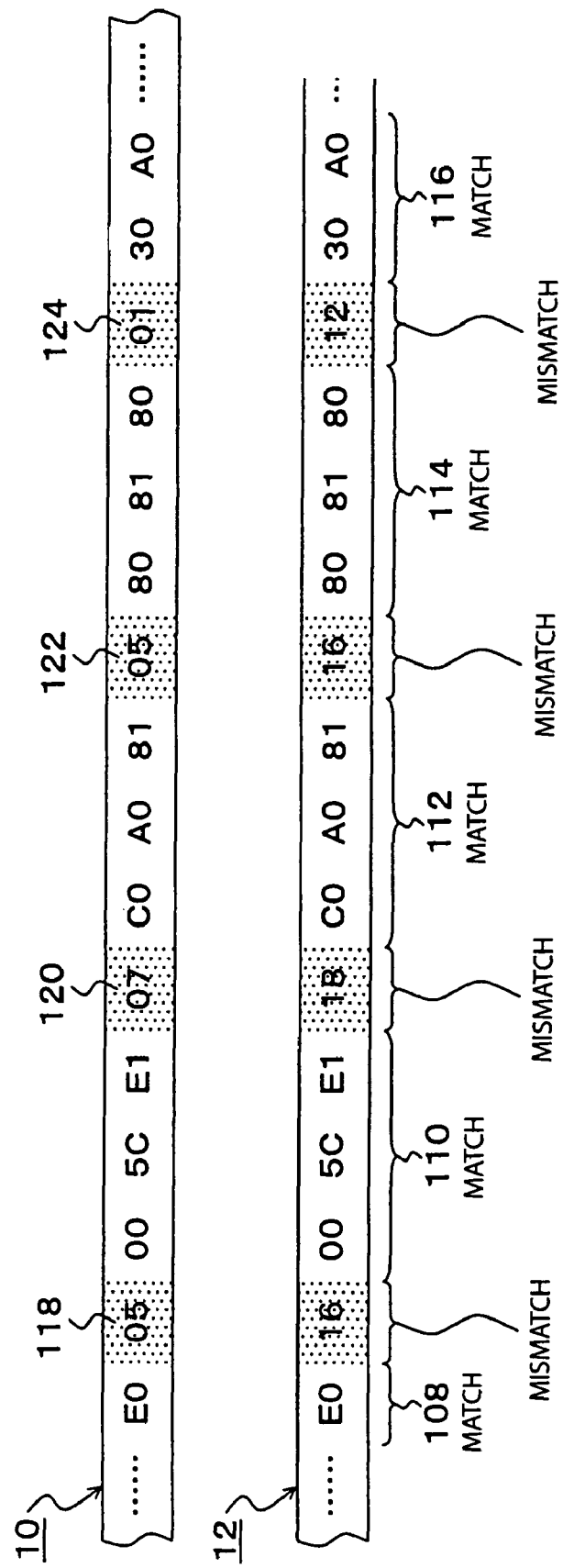
FIG. 21 is an explanatory diagram of the replacing process of the present invention for differential data having the same value.

FIG. 21 is an explanatory diagram of a process in the case where a value of the same difference is repeated as a differential pattern of a replacement portion in the replacing process having the replacement data 96 as shown in FIG. 18. In the old file 10 and the new file 12, a byte code of 4 bits is expressed by a hexadecimal numerical value. When the new and old files are compared, mismatching portions 118, 120, 122, and 124 exist between matching portions 108, 110, 112, 114, and 116, respectively. In the mismatching portions 118 to 124, each difference between the 2-byte data of the old file 10 and the 2-byte data of the new file 12 is equal to the same hexadecimal value "11". In such a case, in the data synchronization process of the present invention, since the difference of the data bytes in the head mismatching portion 118 is equal to the value obtained for the first time, the transfer replacement code 38 in FIG. 8B is generated and new data "16" is added thereto. On the other hand, with respect to the second and subsequent mismatching portions 120, 122, and 124, since the differences of the data bytes are equal to the same hexadecimal value "11", in this case, the transfer increase code 40 in FIG. 8C is generated and new data is not added. Thus, redundancy of the differential data, which is formed by the replacing process, can be reduced, and a differential data amount can be largely decreased. In this case, on a reconstructing side of the differential data, the difference "11" between the new data "16" and the old data "05" is added to the transfer replacement code 38, and the old data is obtained. When the transfer increase code 40 is received after that, the new data can be reconstructed by adding the difference "11" to the corresponding old data.

Figure 22:
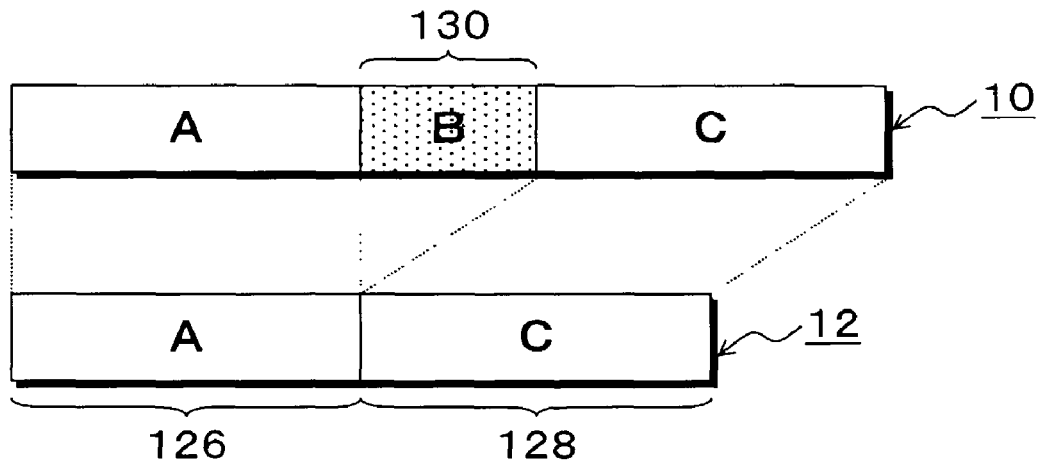
FIG. 22 is an explanatory diagram of new and old file patterns to which a shifting process of data deletion is executed in the present invention.

FIG. 22 is an explanatory diagram of new and old file patterns to which a shifting process of data deletion is executed by the present invention. In the new and old file patterns, by setting the data B among data A, B, and C of the old file 10 to deletion data 130, data A and C of the new file 12 is obtained. Portions corresponding to the data A and C in the new file 12 become matching portions 126 and 128.

Figure 23:
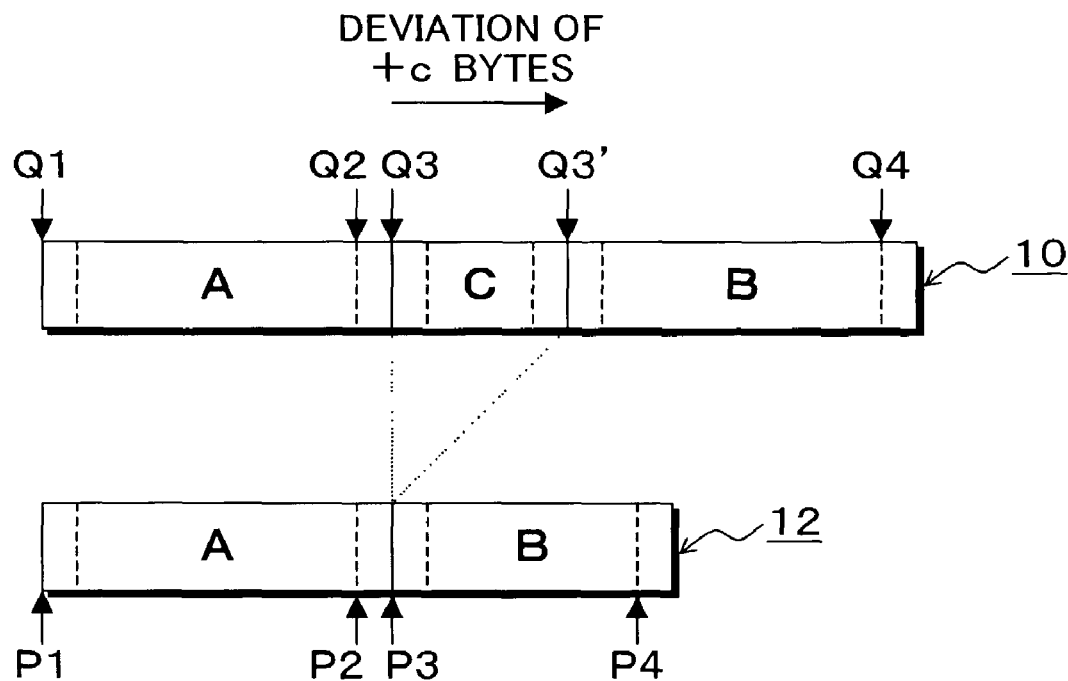
FIG. 23 is an explanatory diagram of the data synchronization process by the pointer control of the present invention for new and old files in FIG. 22 as targets.
Figure 24:
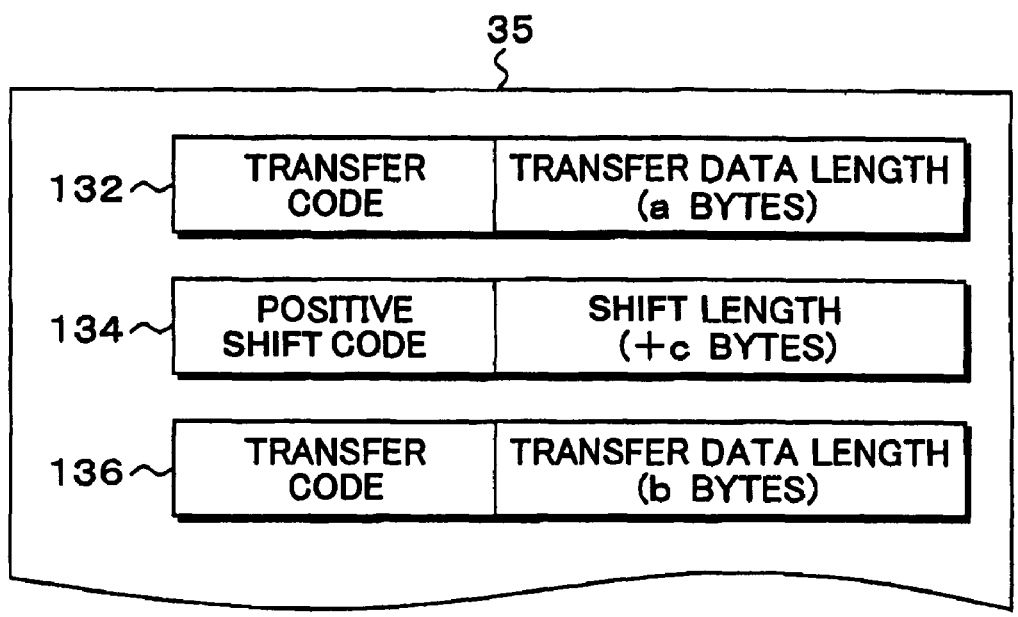
FIG. 24 is an explanatory diagram of a differential data file formed by the process in FIG. 22.

FIG. 23 shows the data synchronization process through the pointer control for new and old file patterns in FIG. 22. In this case, a mismatch with the 1-byte data of the pointer Q3 of the old file 10, that is, with the head byte of data C is determined at the position of the pointer P3 of the new file 12. By searching the old file in the forward and backward directions of the mismatching portion, a data match is obtained at the first byte of the data B that is deviated backward by +c bytes. Therefore, the pointer Q3 of the old file 10 is shifted to the pointer Q3'. By the shift to the pointer Q3', a positive shift code 134 of +c bytes, as a second shift length in the differential data file 35 in FIG. 24, is generated. The control code in the data A and B of the preceding matching portions are transfer codes 132 and 136.

Figure 25:
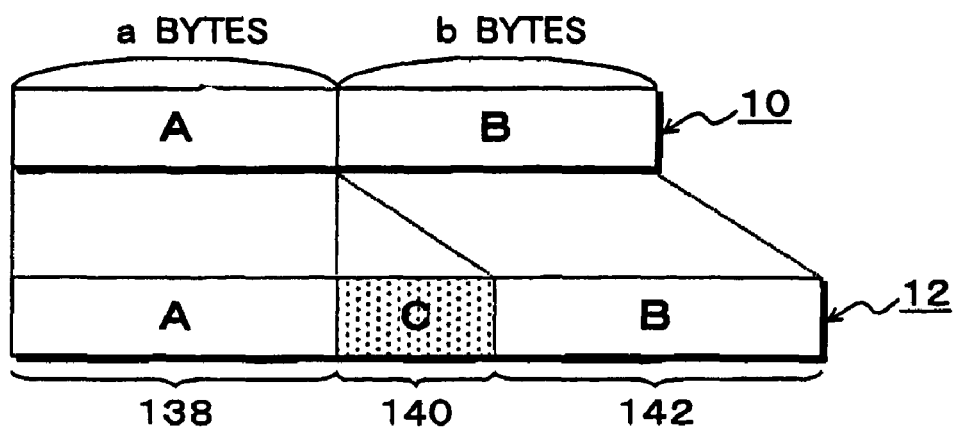
FIG. 25 is an explanatory diagram of new and old file patterns to which a shifting process of data insertion is executed in the present invention.

FIG. 25 is an explanatory diagram of new and old file patterns to which a shifting process of data insertion is executed in the present invention. In this case, data C is inserted between data A and B of the old file 10 as shown in the new file 12, thereby forming insertion data 140. Where the insertion data 140 in the new file 12 is between data A 138 and data B 142.

Figure 26:
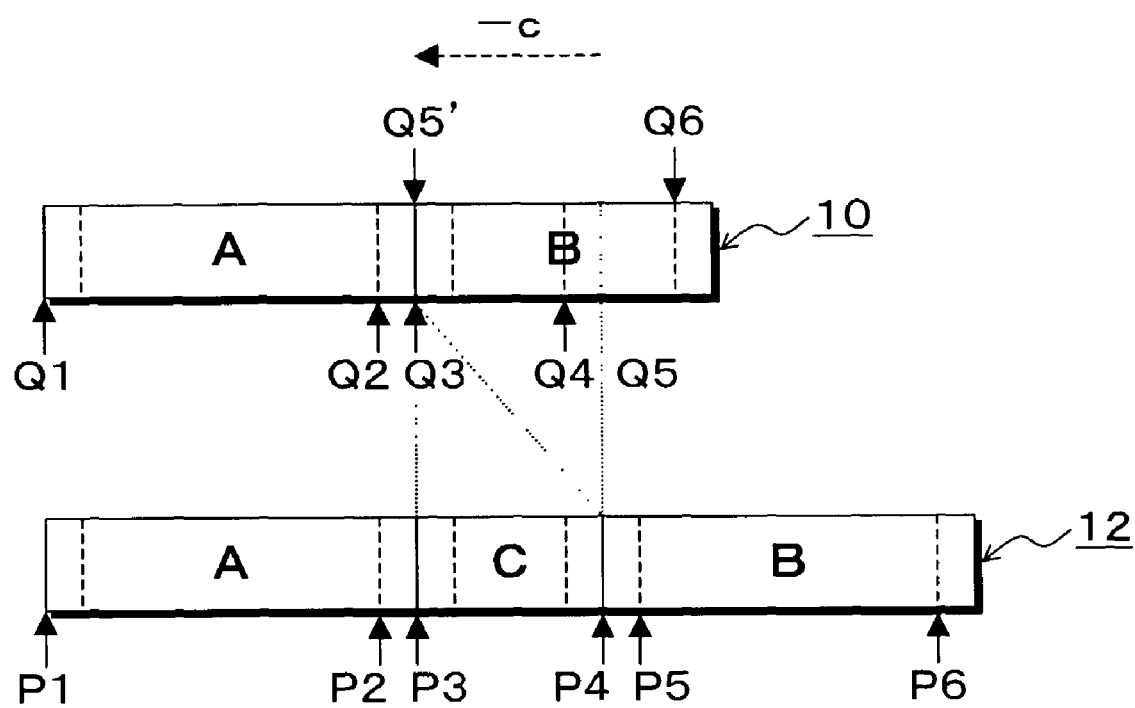
FIG. 26 is an explanatory diagram of the data synchronization process by the pointer control of the present invention for new and old files in FIG. 25 as targets.
Figure 27:
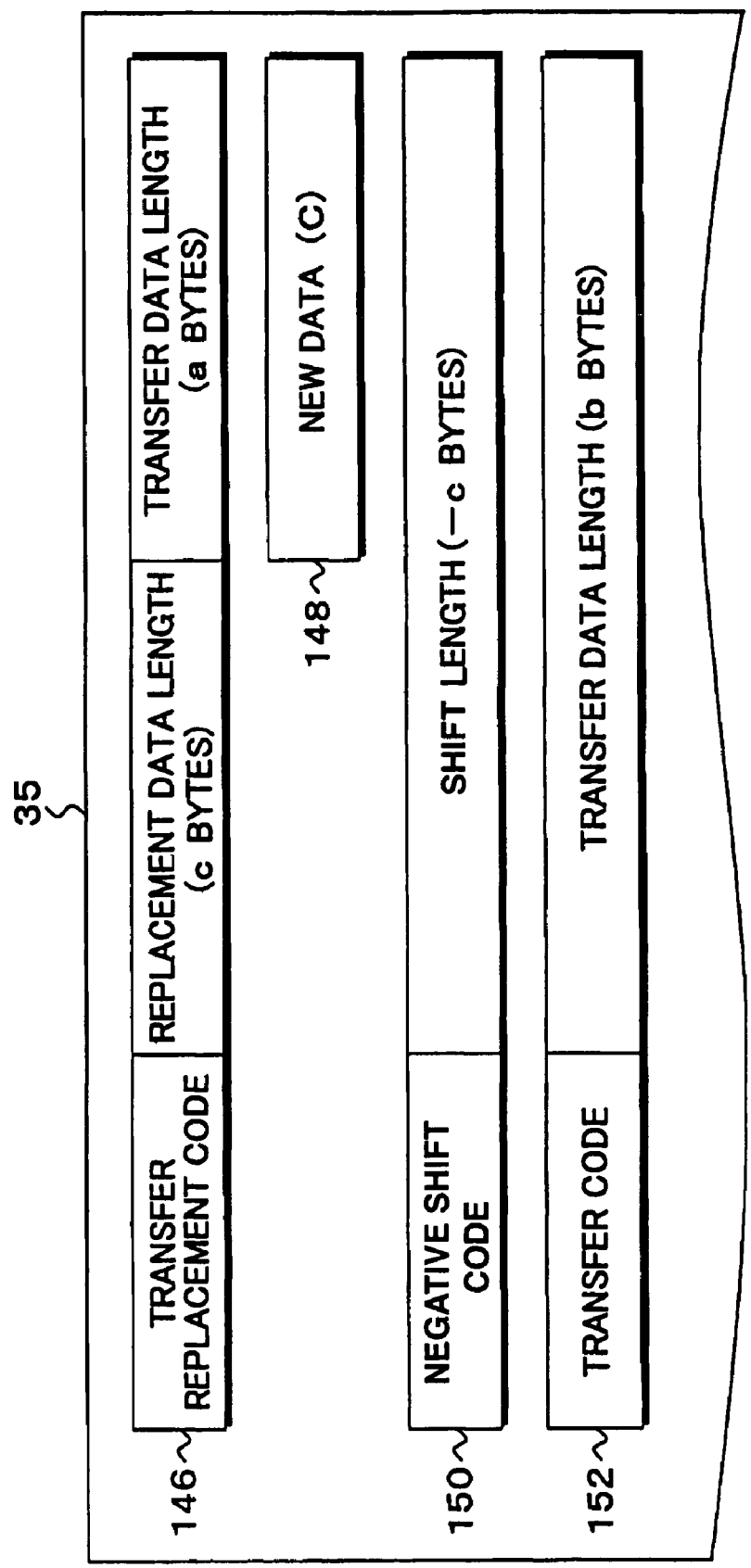
FIG. 27 is an explanatory diagram of a differential data file formed by the process in FIG. 26.

FIG. 26 shows the data synchronization process by the pointer control of the present invention for the new and old file patterns in FIG. 25. In this case, the first byte of each of the data C and B does not match at the positions of the pointer P3 of the new file 12 and the pointer Q3 of the old file 10, and even if the old file is searched in the forward and backward directions of the mismatching portion in the old file 10, the matching portion is not obtained. Therefore, the pointers are sequentially shifted backward with respect to the new file 12 and the old file 10. When they are shifted to the pointers P4 and Q4, the 1-byte data does not match. Subsequently, when they are shifted to the pointers P5 and Q5, the 1-byte data does not match. In association with it, by searching the old file in the forward and backward directions of the mismatching portion on the old file 10, the matching portion with the first byte of the data B is determined. By such a determination of the matching portion, the data C of the pointers P3 to P4 in the new file 12 can be determined to be the new data, that is, the data serving as an inserting portion. Therefore, in the differential data file 35 in FIG. 27, a transfer replacement code 146 is generated by the replacing process. New data 148 having the value of C is added to the transfer replacement code 146, and the resultant code is output. Subsequently, in FIG. 26, a negative shift code 150, showing that the pointer Q5 has been shifted in the negative direction as a forward direction by −c bytes in the old file 10 and becomes the pointer Q5', is formed and output. Lastly, the matching portion of the data B is determined by the synchronous shift of the pointers P5 to P6 and the pointers Q5' to Q6', and a transfer code 152 in FIG. 27 is formed and output.

Figure 28B:
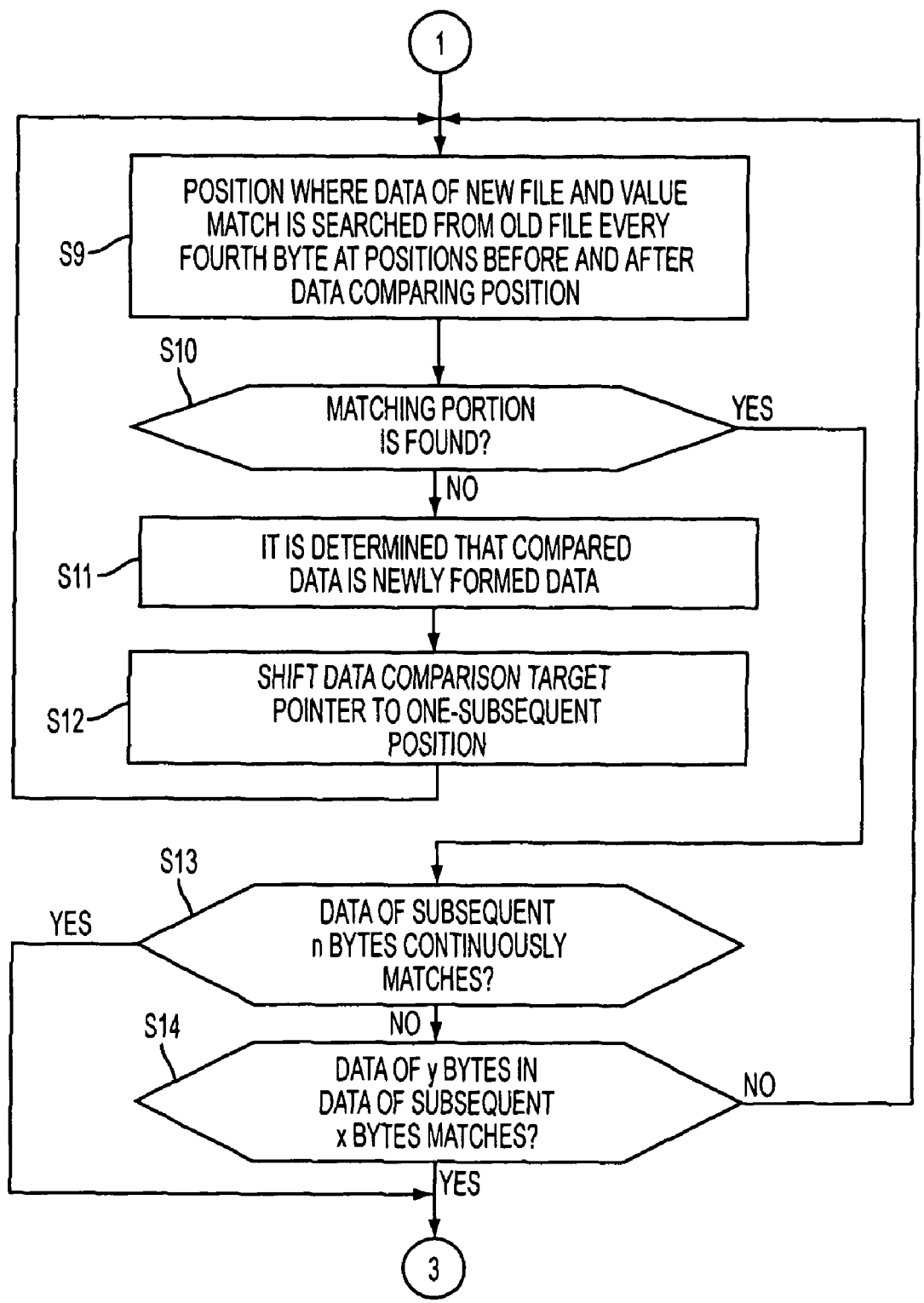
Figure 28C:
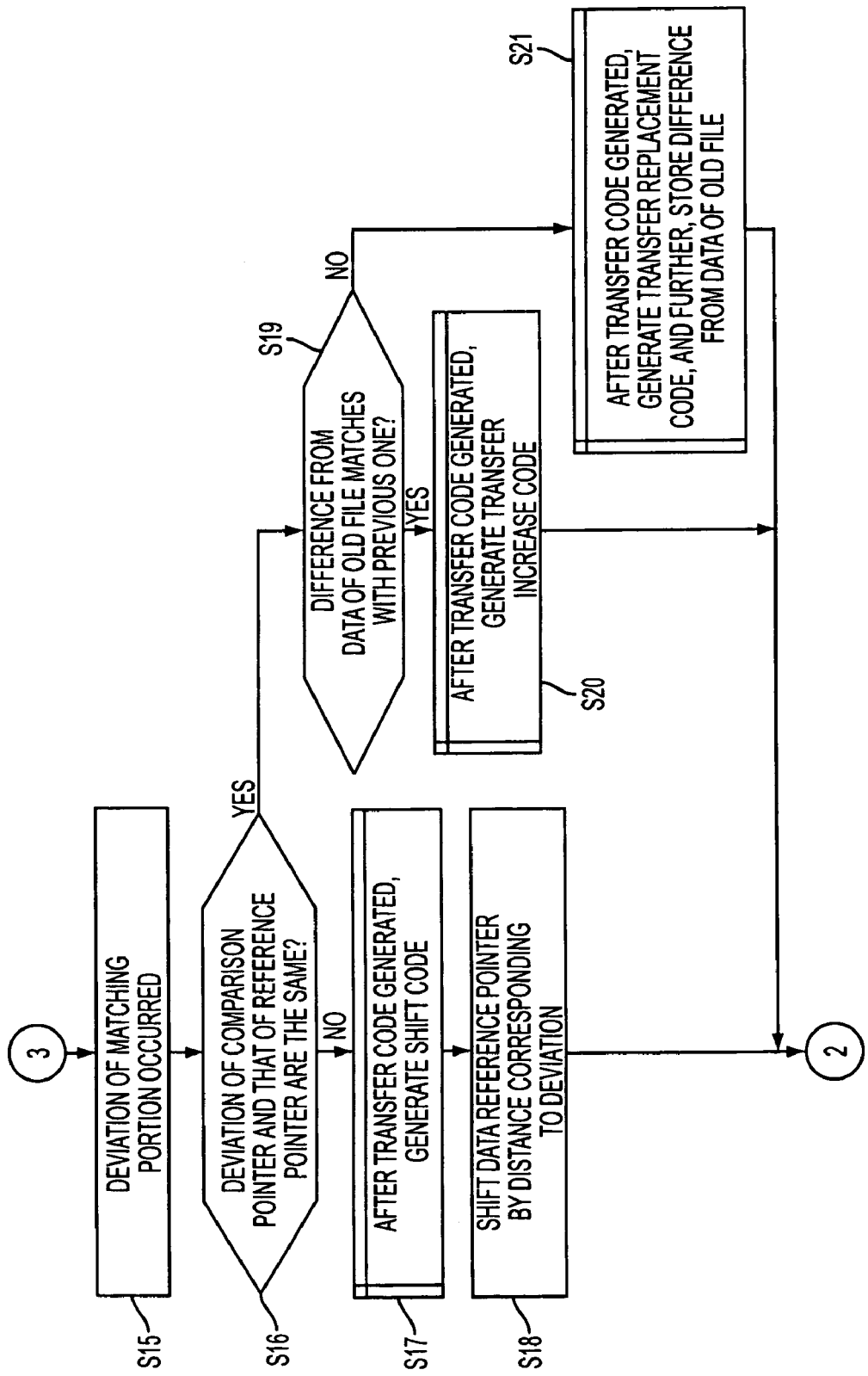

FIGS. 28A to 28C are flowcharts to realize a program for specifically realizing the data synchronization process according to the present invention shown in FIGS. 10 to 27. First, in step S1, the old file and the new file are read out. In next step S2, the data comparison target pointer P and the data reference pointer Q are set to the heads of the files, respectively. In step S3, values of the data comparison target pointer P and the data reference pointer Q are compared. In step S4, if the compared data, that is, the 1-byte data has the same value, step S5 follows and this 1-byte data is determined to be a copy of the data of the old file. In step S6, a position and a length of a copy source are stored. In next step S7, each of the data comparison target pointer P and the data reference pointer Q is shifted backward by one byte. In step S8, if the data comparison target pointer P is not the end of the new file, the processing routine is returned to step S3 and similar processes are repeated. In step S8, if the data comparison target pointer P is the end of the new file, step S22 follows. If a non-processed copy source has been stored, the transfer code is generated in step S23. Thereafter, the series of processes is finished. If the compared data does not match in step S4, the processing routine advances to step S9 in FIG. 28B. In step S9, positions, which have values matching with the data of the new file are searched from the old file every other 4 bytes at positions before and after the data comparison position. If the matching portion cannot be found in step S10, then it is determined in step S11 that the compared data is the newly formed data. In step S12, the data comparison target pointer P is shifted backward by one byte. If the insertion data exists in the new file, the processes in steps S9 to S12 are repeated up to the last 1-byte data of the insertion data. If the matching portion is found in step S10, step S13 follows. As shown in FIG. 8, whether the data of (n) bytes behind the matching portion continuously matches or not is determined. If this condition is not satisfied, step S14 follows and whether the data of (y) bytes that is (x) bytes behind the matching portion matches as shown in FIG. 9 or not is determined. If one of the conditions in steps S13 and S14 is satisfied, step S15 follows and it is determined that a deviation of the matching portion has occurred. Subsequently, in step S16, whether the deviation of the data comparison target pointer P and that of the data reference pointer Q are the same or not is determined. If they differ, since this means that the data reference pointer Q has been deviated, in step S17, the transfer code based on the information stored in step S6 is generated and the shift code indicative of the shift of the pointer is generated. Upon generation of the shift code, if the shift is in the negative direction as a forward direction, a negative shift code is generated, and if it is the shift in the positive direction as a backward direction, a positive shift code is generated. In step S18, the data reference pointer Q is shifted by a distance corresponding to the deviation. If the deviation of the data comparison target pointer P and that of the data reference pointer Q are the same in step S16, then it is determined that the process is the replacing process. Step S19 follows. In step S19, whether the difference from the data of the old file matches with the previous one or not is discriminated. If the differential data does not match with the previous one, step S21 follows. The transfer code is generated on the basis of the information stored in step S6, thereafter, the transfer replacement code indicative of the replacement is generated, and further, the value of the difference from the data of the old file is stored. If the difference from the data of the old file matches with the previous one in step S19, step S20 follows. The transfer code according to the contents stored in step S6 is generated and thereafter, the transfer increase code, which does not need to add the new data, is generated. The above processes are repeated until the data comparison target pointer P reaches the end of the new file in step S8 in FIG. 23.

An embodiment of a computer-readable recording medium in which a program for realizing the data synchronization process of the present invention has been stored will now be described. A computer system which executes the program for performing the data synchronization process of the present invention comprises a CPU, a RAM, a ROM, a hard disk drive, a CD-ROM drive, a FD drive, a keyboard, a mouse, a display, an input/output interface, a LAN interface, a modem, and the like. The data synchronization program of the present invention is stored into a recording medium, for example, a portable memory medium such as CD-ROM, floppy disk (R), DVD disk, magnetooptic disk, IC card, or the like, a database connected via a line by using a modem or an LAN interface, or a database of another computer system, installed into a computer which realizes the present invention, and thereafter, executed.

As described above, according to the present invention, if the mismatch is determined due to the sequential comparison of the new and old files, the old file is searched in both of the forward and backward directions of the old file, and the data in the old file, which was once referred to, can be again referred to. Thus, it is also possible to: cope with other patterns exceeding the conventional categories "replacement", "insertion", and "deletion", the creation of the redundant differential data can be reduced, and the size of differential data can be decreased.

Owing to the sequential comparison of the new and old files, even if the process to allow the updating portion to correspond was erroneously performed, in the subsequent processes, by again referring to the data in the old file which was once referred to: the erroneously formed portion can be corrected, influence by the error of the correspondence process is suppressed to the minimum, and the reliability of the updating by the differential data can be improved.

In the updating process of the present invention, although a plurality of patterns having the same difference are formed and the new data obtained after the updating is necessary for the first time, by forming the replacement information showing the use of the past pattern with respect to the second and subsequent patterns, the addition of the new data becomes unnecessary. Even if the replacing process increases, the redundancy of the differential data can be reduced and the size of differential data can be decreased.

In the present invention, in the case where the mismatch of, for example, the byte data of the new and old files is determined, if the match of the byte data is obtained by searching the old file in the forward and backward directions of the mismatching portion in the old file, the match of the data of a predetermined number of bytes or more subsequent to it is obtained, or the match of the data of another predetermined number of bytes or more among subsequent predetermined bytes is obtained, then it is determined that the relevant portion is the matching portion. The shift information indicative of the deviation of the data is output. The shift information indicative of the control position on the old file, that is the deviation of the pointer, is certainly generated. If the matching portions of a certain number cannot be obtained in the lump, by executing the replacing process, an opportunity of forming the replacement information is increased. If the opportunity of forming the replacement information is increased, the replacement information, which does not need the addition of the new data at the second and subsequent times, can be formed with respect to the same pattern. Thus, the redundancy of the differential data amount can be reduced as a whole, and the size of differential data can be decreased.

The present invention is not limited to the foregoing embodiments and may incorporate proper modifications so long as they can accomplish the objects and advantages of the present invention. The present invention is not limited by the numerical values shown in the foregoing embodiment.

What is claimed is:

1. A method for forming a differential data, with steps performed by a data processor, comprising:
    comparing a new file and an old file sequentially from head of the new file and head of the old file on a predetermined data unit basis;
    when said sequential comparison results in determination of a match between the new data and the old data, outputting transfer information showing a position and a data length of the matching data in the old file; and
    when said sequential comparison results in determination of a mismatching between the new data and the old data, searching for a portion matching with the new data in both forward and backward directions from a position of the mismatch in the old file;
    if the matching portion can be found, outputting shift information from the mismatch portion up to the matching portion in the old file; and
    if the matching portion cannot be found,
    when a first difference value of the mismatching portion does not match with a second difference value previously stored, outputting the transfer replacement information showing a length of the mismatching portion and the new data and storing the first difference value; and
    when the first difference value matches with the second difference value previously stored, outputting transfer increase information showing the first difference value is the same as the second difference value.

2. The method according to claim 1, wherein in said searching for a matching portion, when the matching portion and continuous matching portions of a predetermined number (n) or more of data subsequent to said matching portion are found in the old file, it is determined that the data matches.

3. The method according to claim 1, wherein in said searching for a matching portion, when the matching portion and matching portions of a predetermined number (y) or more of data distributed among a predetermined number (x) of data subsequent to said matching portion are found in the old file, it is determined that the data matches.

4. The method according to claim 1, wherein in said outputting shift information, a shifting direction in which a forward position in said old file is set to a negative direction and a backward position in said old file is set to a positive direction and a shift length showing a length of data up to the matching portion in the old file is output as said shift information.

5. The method according to claim 1, wherein in said searching for a matching portion, if a structure of the old file and the new file is that of a program file written by an n-bit code, the searching is performed every other (n) bits in both forward and backward directions from the position determined to be mismatching in the old file.

6. The method according to claim 1, wherein in said outputting transfer replacement information, if the matching portion cannot be found in said searching for a matching portion due to the insertion of new data in the new file, said new data is added to the replacement information showing the data of the mismatching portion of the old file at a position until the matching portion can be searched and the resultant replacement information is output.

7. The method according to claim 1, wherein in said outputting shift information, if the matching portion with the data of the new file cannot be found in said searching for a matching portion due to deletion of the data in the old file, the shift information showing a shifting direction and the shift amount up to the backward matching portion in the old file is output.

8. An apparatus for forming a differential data comprising:
    a computer system, comprising:
    a data comparing unit which sequentially compares a new file and an old file from heads of the files on a predetermined data unit basis;
    a transfer information forming unit which, when a match is determined between the new data and the old data, as a result of said sequential comparison, outputs transfer information showing a position in the old file and a data length of the matching data;
    a matching portion search unit which, when a mismatch is determined between the new data and the old data, as a result of said sequential comparison, searches for a matching portion with the new data in both forward and backward directions from a position where the mismatch has been determined in the old file;

a shift information forming unit which, if the matching portion can be found, outputs shift information from the mismatch up to the matching portion in the old file; and a replacement information forming unit which, if the matching portion cannot be found, when a first difference value of a mismatching portion between the old data and the new data does not match with a second difference value previously stored, outputs by adding the new data as transfer replacement information showing a length of the mismatching portion and the new data, and storing the first difference data, and when the first difference value matches with the second difference value, outputs transfer increase information showing the first difference value is the same as the second difference value.

9. A computer-readable storage medium which stores a differential data forming program allowing a computer to execute:

comparing a new file and an old file sequentially from head of the new file and head of the old file on a predetermined data unit basis;

when said sequential comparison results in determination of a match between the new data and the old data, outputting transfer information showing a position on the old file and a data length of the matching data; and when said sequential comparison results in determination of a mismatch between the new data and the old data, searching for a matching portion with the new data in both forward and backward directions from a position determined to be mismatching on the old file;

if the matching portion can be found, outputting shift information from the mismatch up to the matching portion in the old file; and if the matching portion cannot be found, when a first difference value of a mismatching portion between the old data and the new data does not match with a second difference value previously stored, outputting transfer replacement information showing a length of the mismatching portion and the new data, and storing the first difference value; and when the first difference value matches with the second difference value, outputting transfer increase information showing the first difference value is the same as the second difference value.

10. The storage medium according to claim 9, wherein in said searching for a matching portion, when the matching portion and continuous matching portions of a predetermined number (n) or more of data subsequent to said matching portion are found in the old file, it is determined that the data matches.

11. The storage medium according to claim 9, wherein in said searching for a matching portion, when the matching portion and matching portions of a predetermined number (y) or more of data distributed among a predetermined number (x) of data subsequent to said matching portion are found in the old file, it is determined that the data matches.

12. The storage medium according to claim 9, wherein in said outputting shift information, a shifting direction in which a forward position in said old file is set to a negative direction and a backward position in said old file is set to a positive direction and a shift length showing a length of data up to the matching portion in the old file is output as said shift information.

13. The storage medium according to claim 9, wherein in said searching for a matching portion, if a structure of the old file and the new file is that of a program file written by an n-bit code, the searching is performed every other (n) bits in both forward and backward directions from the position determined to be mismatching in the old file.

14. The storage medium according to claim 9, wherein in said outputting transfer replacement information, if the matching portion cannot be found in said searching for a matching portion due to the insertion of new data in the new file, said new data is added to the replacement information showing the data of the mismatching portion of the old file at a position until the matching portion can be found and the resultant replacement information is output.

15. The storage medium according to claim 9, wherein in said outputting shift information, if the matching portion with the data of the new file cannot be found in said searching for a matching portion due to deletion of the data in the old file, shift information showing a shifting direction and the shift amount up to the backward matching portion in the old file is output.

* * * * *

UNITED STATES PATENT AND TRADEMARK OFFICE
CERTIFICATE OF CORRECTION

PATENT NO. : 7,908,250 B2  
APPLICATION NO. : 10/265317  
DATED : March 15, 2011  
INVENTOR(S) : Kohei Terazono et al.

It is certified that error appears in the above-identified patent and that said Letters Patent is hereby corrected as shown below:

Title Pg, Item (54) Title: delete "DIFFERENTIAL DATA FORMING" and insert -- DATA SYNCHRONIZATION --, therefor.

Column 1, Line 1 (Title) delete "DIFFERENTIAL DATA FORMING" and insert -- DATA SYNCHRONIZATION --, therefor.

Column 18, Line 9 in Claim 1, after "outputting" delete "the".

Column 18, Line 14 in Claim 1, delete "value previously stored," and insert -- value, --, therefor.

Signed and Sealed this  
Seventh Day of June, 2011

David J. Kappos  
*Director of the United States Patent and Trademark Office*